(12) United States Patent
Tammera et al.

(10) Patent No.: US 9,358,493 B2
(45) Date of Patent: Jun. 7, 2016

(54) APPARATUS AND SYSTEMS HAVING AN ENCASED ADSORBENT CONTACTOR AND SWING ADSORPTION PROCESSES RELATED THERETO

(75) Inventors: Robert F. Tammera, Warrenton, VA (US); Richard J. Basile, Rockaway, NJ (US); Jeffrey W. Frederick, Centreville, VA (US)

(73) Assignee: ExxonMobil Upstream Research Company, Spring, TX (US)

(*) Notice: Subject to any disclaimer, the term of this patent is extended or adjusted under 35 U.S.C. 154(b) by 0 days.

(21) Appl. No.: 13/979,623

(22) PCT Filed: Feb. 27, 2012

(86) PCT No.: PCT/US2012/026797
§ 371 (c)(1),
(2), (4) Date: Jul. 12, 2013

(87) PCT Pub. No.: WO2012/118755
PCT Pub. Date: Sep. 7, 2012

(65) Prior Publication Data
US 2014/0013955 A1 Jan. 16, 2014

Related U.S. Application Data

(60) Provisional application No. 61/448,117, filed on Mar. 1, 2011.

(51) Int. Cl.
*B01D 53/04* (2006.01)
*B01J 20/10* (2006.01)
(Continued)

(52) U.S. Cl.
CPC ........ *B01D 53/0407* (2013.01); *B01D 53/0473* (2013.01); *B01J 20/10* (2013.01);
(Continued)

(58) Field of Classification Search
CPC .. B01D 53/04; B01D 53/0407; B01D 53/047; B01D 53/0462; B01D 2253/342; B01D 2253/3425; B01J 20/10; B01J 20/18; B01J 20/28; Y10T 156/10
USPC ............... 96/108, 121, 152; 422/177, 180
See application file for complete search history.

(56) References Cited

U.S. PATENT DOCUMENTS

| 1,868,138 A | 7/1932 | Fisk |
| 3,124,152 A | 3/1964 | Payne |

(Continued)

FOREIGN PATENT DOCUMENTS

| CA | 2 234 924 | 4/1998 |
| CA | 2 224 471 | 6/1998 |

(Continued)

OTHER PUBLICATIONS (Aug. 2008), "Rapid Cycle Pressure Swing Adsorption (RCPSA)," ExxonMobil Upstream Research Company, 4 pgs.

(Continued)

*Primary Examiner* — Frank Lawrence
(74) *Attorney, Agent, or Firm* — ExxonMobil Upstream Research Company Law Dept.

(57) ABSTRACT

Provided are encased parallel channel adsorbent contactor apparatus and systems and swing adsorption processes related thereto. Encased parallel channel adsorbent contactors are useful in swing adsorption processes. A plurality of the encased adsorbent contactors are loaded and sealed together in a swing adsorption vessel such that substantially an entire feed stream must pass through the channels of the contactors and not through stray gaseous stream paths between contactors.

20 Claims, 14 Drawing Sheets

(51) Int. Cl.
*B01J 20/18* (2006.01)
*B01J 20/28* (2006.01)
*B01J 20/20* (2006.01)
*B01J 20/22* (2006.01)
*B01J 20/32* (2006.01)
*B01D 53/047* (2006.01)

(52) U.S. Cl.
CPC .............. *B01J 20/18* (2013.01); *B01J 20/20* (2013.01); *B01J 20/226* (2013.01); *B01J 20/28* (2013.01); *B01J 20/2805* (2013.01); *B01J 20/28042* (2013.01); *B01J 20/28052* (2013.01); *B01J 20/3204* (2013.01); *B01J 20/3248* (2013.01); *B01J 20/3257* (2013.01); *B01D 2252/20484* (2013.01); *B01D 2252/20489* (2013.01); *B01D 2253/102* (2013.01); *B01D 2253/104* (2013.01); *B01D 2253/106* (2013.01); *B01D 2253/1085* (2013.01); *B01D 2253/204* (2013.01); *B01D 2253/25* (2013.01); *B01D 2253/308* (2013.01); *B01D 2253/342* (2013.01); *B01D 2253/3425* (2013.01); *B01D 2256/24* (2013.01); *B01D 2256/245* (2013.01); *B01D 2257/304* (2013.01); *B01D 2257/306* (2013.01); *B01D 2257/308* (2013.01); *B01D 2257/504* (2013.01); *B01D 2259/40005* (2013.01); *Y02C 10/08* (2013.01); *Y10T 156/10* (2015.01)

(56) References Cited

U.S. PATENT DOCUMENTS

| | | | | |
|---|---|---|---|---|
| 3,142,547 | A | 7/1964 | Marsh et al. | |
| 3,508,758 | A | 4/1970 | Strub | |
| 3,602,247 | A | 8/1971 | Bunn et al. | |
| 3,788,036 | A | 1/1974 | Lee et al. | |
| 3,967,464 | A | 7/1976 | Cormier et al. | |
| 4,187,092 | A * | 2/1980 | Woolley | 62/46.2 |
| 4,261,815 | A | 4/1981 | Kelland | |
| 4,324,565 | A | 4/1982 | Benkmann | |
| 4,325,565 | A | 4/1982 | Winchell | |
| 4,329,162 | A | 5/1982 | Pitcher, Jr. | |
| 4,340,398 | A | 7/1982 | Doshi et al. | |
| 4,386,947 | A * | 6/1983 | Mizuno et al. | 96/137 |
| 4,461,630 | A | 7/1984 | Cassidy et al. | 55/25 |
| 4,711,968 | A | 12/1987 | Oswald et al. | |
| 4,770,676 | A | 9/1988 | Sircar et al. | |
| 4,784,672 | A | 11/1988 | Sircar | |
| 4,790,272 | A | 12/1988 | Woolenweber | |
| 4,814,146 | A * | 3/1989 | Brand et al. | 422/179 |
| 4,816,039 | A | 3/1989 | Krishnamurthy et al. | |
| 4,877,429 | A | 10/1989 | Hunter | |
| 4,977,745 | A | 12/1990 | Heichberger | 62/10 |
| 5,110,328 | A | 5/1992 | Yokota et al. | |
| 5,125,934 | A | 6/1992 | Krishnamurthy et al. | |
| 5,169,006 | A | 12/1992 | Stelzer | |
| 5,174,796 | A | 12/1992 | Davis et al. | |
| 5,224,350 | A | 7/1993 | Mehra | |
| 5,234,472 | A | 8/1993 | Krishnamurthy et al. | |
| 5,292,990 | A | 3/1994 | Kantner et al. | |
| 5,306,331 | A | 4/1994 | Auvil et al. | |
| 5,365,011 | A | 11/1994 | Ramachandran et al. | 585/829 |
| 5,370,728 | A | 12/1994 | LaSala et al. | |
| 5,547,641 | A * | 8/1996 | Smith et al. | 422/181 |
| 5,565,018 | A | 10/1996 | Baksh et al. | |
| 5,700,310 | A | 12/1997 | Bowman et al. | |
| 5,733,451 | A | 3/1998 | Coellner et al. | 210/496 |
| 5,750,026 | A | 5/1998 | Gadkaree et al. | |
| 5,792,239 | A | 8/1998 | Reinhold, III et al. | |
| 5,807,423 | A | 9/1998 | Lemcoff et al. | |
| 5,811,616 | A | 9/1998 | Holub et al. | |
| 5,827,358 | A | 10/1998 | Kulish et al. | |
| 5,906,673 | A | 5/1999 | Reinhold, III et al. | |
| 5,924,307 | A | 7/1999 | Nenov | |
| 5,935,444 | A | 8/1999 | Johnson et al. | 210/691 |
| 5,968,234 | A | 10/1999 | Midgett, II et al. | |
| 5,976,221 | A | 11/1999 | Bowman et al. | |
| 5,997,617 | A | 12/1999 | Czabala et al. | |
| 6,007,606 | A | 12/1999 | Baksh et al. | |
| 6,011,192 | A | 1/2000 | Baker et al. | |
| 6,053,966 | A | 4/2000 | Moreau et al. | |
| 6,063,161 | A | 5/2000 | Keefer et al. | |
| 6,099,621 | A | 8/2000 | Ho | |
| 6,129,780 | A | 10/2000 | Millet et al. | |
| 6,136,222 | A | 10/2000 | Friesen et al. | |
| 6,147,126 | A | 11/2000 | DeGeorge et al. | |
| 6,171,371 | B1 | 1/2001 | Derive et al. | |
| 6,176,897 | B1 | 1/2001 | Keefer | |
| 6,179,900 | B1 | 1/2001 | Behling et al. | 95/45 |
| 6,194,079 | B1 | 2/2001 | Hekal | 428/566 |
| 6,210,466 | B1 | 4/2001 | Whysall et al. | |
| 6,231,302 | B1 | 5/2001 | Bonardi | |
| 6,245,127 | B1 | 6/2001 | Kane et al. | |
| 6,284,021 | B1 | 9/2001 | Lu et al. | |
| 6,311,719 | B1 | 11/2001 | Hill et al. | |
| 6,345,954 | B1 | 2/2002 | Al-Himyary et al. | |
| 6,398,853 | B1 | 6/2002 | Keefer et al. | |
| 6,402,813 | B2 | 6/2002 | Monereau et al. | 95/96 |
| 6,406,523 | B1 | 6/2002 | Connor et al. | |
| 6,432,379 | B1 * | 8/2002 | Heung | 423/648.1 |
| 6,436,171 | B1 | 8/2002 | Wang et al. | |
| 6,444,012 | B1 | 9/2002 | Dolan et al. | |
| 6,444,014 | B1 | 9/2002 | Mullhaupt et al. | |
| 6,444,523 | B1 | 9/2002 | Fan et al. | |
| 6,451,095 | B1 | 9/2002 | Keefer et al. | |
| 6,457,485 | B2 | 10/2002 | Hill et al. | |
| 6,471,939 | B1 | 10/2002 | Boix et al. | |
| 6,488,747 | B1 | 12/2002 | Keefer | |
| 6,497,750 | B2 | 12/2002 | Butwell et al. | |
| 6,500,241 | B2 | 12/2002 | Reddy | |
| 6,500,404 | B1 | 12/2002 | Camblor Fernandez et al. | |
| 6,503,299 | B2 | 1/2003 | Baksh et al. | 95/98 |
| 6,506,351 | B1 | 1/2003 | Jain et al. | |
| 6,514,318 | B2 | 2/2003 | Keefer | 95/96 |
| 6,514,319 | B2 | 2/2003 | Keefer et al. | 95/101 |
| 6,517,609 | B1 | 2/2003 | Monereau et al. | |
| 6,531,516 | B2 | 3/2003 | Davis et al. | |
| 6,533,846 | B1 | 3/2003 | Keefer et al. | |
| 6,565,627 | B1 | 5/2003 | Golden et al. | |
| 6,565,635 | B2 | 5/2003 | Keefer et al. | |
| 6,565,825 | B2 | 5/2003 | Ohji et al. | |
| 6,572,678 | B1 | 6/2003 | Wijmans et al. | |
| 6,579,341 | B2 | 6/2003 | Baker et al. | |
| 6,593,541 | B1 | 7/2003 | Herren | |
| 6,595,233 | B2 | 7/2003 | Pulli | |
| 6,605,136 | B1 | 8/2003 | Graham et al. | |
| 6,607,584 | B2 | 8/2003 | Moreau et al. | |
| 6,630,012 | B2 | 10/2003 | Wegeng et al. | |
| 6,641,645 | B1 | 11/2003 | Lee et al. | |
| 6,651,645 | B1 | 11/2003 | Nunez Suarez | |
| 6,660,064 | B2 | 12/2003 | Golden et al. | 95/96 |
| 6,660,065 | B2 | 12/2003 | Byrd et al. | |
| 6,692,626 | B2 | 2/2004 | Keefer et al. | 204/491 |
| 6,712,087 | B2 | 3/2004 | Hill et al. | |
| 6,742,507 | B2 | 6/2004 | Keefer et al. | 123/585 |
| 6,746,515 | B2 | 6/2004 | Wegeng et al. | |
| 6,752,852 | B1 | 6/2004 | Jacksier et al. | |
| 6,802,889 | B2 | 10/2004 | Graham et al. | |
| 6,814,771 | B2 * | 11/2004 | Scardino et al. | 55/385.3 |
| 6,835,354 | B2 | 12/2004 | Woods et al. | |
| 6,840,985 | B2 | 1/2005 | Keefer | 96/125 |
| 6,866,950 | B2 | 3/2005 | Connor et al. | 429/13 |
| 6,893,483 | B2 | 5/2005 | Golden et al. | 95/96 |
| 6,902,602 | B2 | 6/2005 | Keefer et al. | 95/97 |
| 6,918,953 | B2 | 7/2005 | Lomax, Jr. et al. | |
| 6,921,597 | B2 | 7/2005 | Keefer et al. | 429/34 |
| 6,974,496 | B2 | 12/2005 | Wegeng et al. | |
| 7,025,801 | B2 | 4/2006 | Moereau | |
| 7,029,521 | B2 | 4/2006 | Johansson | 96/128 |
| 7,077,891 | B2 | 7/2006 | Jaffe et al. | 96/108 |
| 7,094,275 | B2 | 8/2006 | Keefer et al. | |
| 7,117,669 | B2 | 10/2006 | Kaboord et al. | |
| 7,144,016 | B2 | 12/2006 | Gozdawa | |

(56) References Cited

U.S. PATENT DOCUMENTS

| | | | |
|---|---|---|---|
| 7,160,356 B2 | 1/2007 | Koros et al. | |
| 7,160,367 B2 | 1/2007 | Babicki et al. | |
| 7,166,149 B2 | 1/2007 | Dunne et al. | |
| 7,172,645 B1 | 2/2007 | Pfister et al. | 95/116 |
| 7,189,280 B2 | 3/2007 | Alizadeh-Khiavi et al. | |
| 7,250,073 B2 | 7/2007 | Keefer et al. | 95/96 |
| 7,250,074 B2 | 7/2007 | Tonkovich et al. | |
| 7,276,107 B2 | 10/2007 | Baksh et al. | |
| 7,279,029 B2 | 10/2007 | Occhialini et al. | 96/121 |
| 7,285,350 B2 | 10/2007 | Keefer et al. | 429/34 |
| 7,297,279 B2 | 11/2007 | Johnson et al. | 210/669 |
| 7,311,763 B2 | 12/2007 | Neary | |
| RE40,006 E | 1/2008 | Keefer et al. | |
| 7,314,503 B2 | 1/2008 | Landrum et al. | |
| 7,354,562 B2 | 4/2008 | Ying et al. | 423/437.2 |
| 7,387,849 B2 | 6/2008 | Keefer et al. | 429/34 |
| 7,390,350 B2 | 6/2008 | Weist, Jr. et al. | |
| 7,404,846 B2 | 7/2008 | Golden et al. | |
| 7,449,049 B2 | 11/2008 | Thomas et al. | |
| 7,510,601 B2 | 3/2009 | Whitley et al. | 96/121 |
| 7,527,670 B2 | 5/2009 | Ackley et al. | |
| 7,578,864 B2 | 8/2009 | Watanabe et al. | |
| 7,604,682 B2 | 10/2009 | Seaton | |
| 7,637,989 B2 | 12/2009 | Bong | |
| 7,641,716 B2 | 1/2010 | Lomax, Jr. et al. | |
| 7,645,324 B2 | 1/2010 | Rode et al. | 95/96 |
| 7,651,549 B2 | 1/2010 | Whitley | |
| 7,674,319 B2 | 3/2010 | Lomax, Jr. et al. | |
| 7,674,539 B2 | 3/2010 | Keefer et al. | 429/17 |
| 7,687,044 B2 | 3/2010 | Keefer et al. | |
| 7,713,333 B2 | 5/2010 | Rege et al. | |
| 7,717,981 B2 | 5/2010 | LaBuda et al. | 95/96 |
| 7,722,700 B2 | 5/2010 | Sprinkle | |
| 7,731,782 B2 | 6/2010 | Kelley et al. | |
| 7,740,687 B2 | 6/2010 | Reinhold, III | |
| 7,744,676 B2 | 6/2010 | Leitmayr et al. | |
| 7,758,988 B2 | 7/2010 | Keefer et al. | 429/34 |
| 7,763,098 B2 | 7/2010 | Alizadeh-Khiavi et al. | |
| 7,819,948 B2 | 10/2010 | Wagner | |
| 7,828,877 B2 | 11/2010 | Sawada et al. | 95/96 |
| 7,854,793 B2 | 12/2010 | Rarig et al. | 96/116 |
| 7,858,169 B2 | 12/2010 | Yamashita | |
| 7,938,886 B2 | 5/2011 | Hershkowitz et al. | |
| 7,947,120 B2 | 5/2011 | Deckman et al. | |
| 7,959,720 B2 | 6/2011 | Deckman et al. | |
| 8,016,918 B2 | 9/2011 | LaBuda et al. | 95/96 |
| 8,034,164 B2 | 10/2011 | Lomax, Jr. et al. | |
| 8,071,063 B2 | 12/2011 | Reyes et al. | |
| 8,128,734 B2 | 3/2012 | Song | 95/96 |
| 8,142,745 B2 | 3/2012 | Reyes et al. | |
| 8,142,746 B2 | 3/2012 | Reyes et al. | |
| 8,192,709 B2 | 6/2012 | Reyes et al. | |
| 8,262,783 B2 | 9/2012 | Stoner et al. | |
| 8,268,043 B2 | 9/2012 | Celik et al. | |
| 8,268,044 B2 | 9/2012 | Wright et al. | 95/96 |
| 8,272,401 B2 | 9/2012 | McLean | |
| 8,287,629 B2 * | 10/2012 | Fujita et al. | 96/126 |
| 8,319,090 B2 | 11/2012 | Kitamura | 136/244 |
| 8,361,200 B2 | 1/2013 | Sayari et al. | |
| 8,444,750 B2 | 5/2013 | Deckman et al. | |
| 8,470,395 B2 | 6/2013 | Khiavi et al. | 427/180 |
| 8,512,569 B2 | 8/2013 | Eaton et al. | 210/650 |
| 8,518,356 B2 | 8/2013 | Schaffer et al. | 423/220 |
| 8,529,662 B2 | 9/2013 | Kelley et al. | |
| 8,529,663 B2 | 9/2013 | Reyes et al. | |
| 8,529,664 B2 | 9/2013 | Deckman et al. | |
| 8,529,665 B2 | 9/2013 | Manning et al. | |
| 8,535,414 B2 | 9/2013 | Johnson et al. | 95/95 |
| 8,545,602 B2 | 10/2013 | Chance et al. | |
| 8,551,444 B2 | 10/2013 | Agnihotri et al. | 423/648.1 |
| 8,591,627 B2 | 11/2013 | Jain | |
| 8,591,634 B2 | 11/2013 | Winchester et al. | 96/127 |
| 8,616,233 B2 | 12/2013 | McLean et al. | 137/246.22 |
| 8,752,390 B2 | 6/2014 | Wright et al. | 60/780 |
| 8,795,411 B2 | 8/2014 | Hufton et al. | 95/90 |
| 8,808,425 B2 | 8/2014 | Genkin et al. | 95/96 |
| 2001/0047824 A1 | 12/2001 | Hill et al. | |
| 2002/0124885 A1 | 9/2002 | Hill et al. | |
| 2002/0162452 A1 | 11/2002 | Butwell et al. | |
| 2003/0075485 A1 | 4/2003 | Ghijsen | |
| 2003/0129101 A1 * | 7/2003 | Zettel | 422/179 |
| 2003/0131728 A1 | 7/2003 | Kanazirev et al. | 95/96 |
| 2003/0170527 A1 | 9/2003 | Finn et al. | |
| 2003/0205130 A1 | 11/2003 | Neu et al. | |
| 2003/0223856 A1 | 12/2003 | Yuri et al. | |
| 2004/0099142 A1 | 5/2004 | Arquin et al. | |
| 2004/0197596 A1 | 10/2004 | Connor et al. | |
| 2004/0232622 A1 | 11/2004 | Gozdawa | |
| 2005/0000234 A1 * | 1/2005 | Kimbara et al. | 62/46.1 |
| 2005/0109419 A1 | 5/2005 | Ohmi et al. | |
| 2005/0114032 A1 | 5/2005 | Wang | |
| 2005/0129952 A1 | 6/2005 | Sawada et al. | |
| 2005/0145111 A1 | 7/2005 | Keefer et al. | |
| 2005/0150378 A1 | 7/2005 | Dunne et al. | |
| 2005/0229782 A1 | 10/2005 | Monereau et al. | |
| 2005/0252378 A1 | 11/2005 | Celik et al. | |
| 2006/0048648 A1 | 3/2006 | Gibbs et al. | |
| 2006/0049102 A1 | 3/2006 | Miller et al. | |
| 2006/0105158 A1 | 5/2006 | Fritz et al. | |
| 2006/0162556 A1 | 7/2006 | Ackley et al. | |
| 2006/0165574 A1 | 7/2006 | Sayari | |
| 2006/0169142 A1 | 8/2006 | Rode et al. | |
| 2006/0236862 A1 | 10/2006 | Golden et al. | |
| 2007/0084241 A1 | 4/2007 | Kretchmer et al. | |
| 2007/0084344 A1 | 4/2007 | Moriya et al. | |
| 2007/0222160 A1 | 9/2007 | Roberts-Haritonov et al. | |
| 2007/0253872 A1 | 11/2007 | Keefer et al. | |
| 2007/0261557 A1 * | 11/2007 | Gadkaree et al. | 96/121 |
| 2007/0283807 A1 | 12/2007 | Whitley | |
| 2008/0051279 A1 | 2/2008 | Klett et al. | |
| 2008/0072822 A1 | 3/2008 | White | |
| 2008/0128655 A1 | 6/2008 | Garg et al. | 252/373 |
| 2008/0282883 A1 | 11/2008 | Rarig et al. | |
| 2008/0282884 A1 | 11/2008 | Kelley et al. | |
| 2008/0282885 A1 | 11/2008 | Deckman et al. | |
| 2008/0282886 A1 | 11/2008 | Reyes et al. | |
| 2008/0282887 A1 | 11/2008 | Chance et al. | |
| 2008/0282892 A1 | 11/2008 | Deckman et al. | |
| 2008/0289497 A1 | 11/2008 | Barclay et al. | |
| 2008/0307966 A1 | 12/2008 | Stinson | 95/187 |
| 2008/0314246 A1 | 12/2008 | Deckman et al. | |
| 2009/0004073 A1 | 1/2009 | Gleize et al. | |
| 2009/0014902 A1 | 1/2009 | Koivunen et al. | 264/11 |
| 2009/0025553 A1 | 1/2009 | Keefer et al. | 95/96 |
| 2009/0037550 A1 | 2/2009 | Mishra et al. | |
| 2009/0071333 A1 | 3/2009 | LaBuda et al. | 95/96 |
| 2009/0079870 A1 | 3/2009 | Matsui | |
| 2009/0107332 A1 | 4/2009 | Wagner | |
| 2009/0151559 A1 | 6/2009 | Verma et al. | |
| 2009/0162268 A1 | 6/2009 | Hufton et al. | 423/210 |
| 2009/0211441 A1 | 8/2009 | Reyes et al. | |
| 2009/0241771 A1 | 10/2009 | Manning et al. | |
| 2009/0249954 A1 * | 10/2009 | Gadkaree et al. | 95/134 |
| 2009/0308248 A1 | 12/2009 | Siskin et al. | |
| 2010/0059701 A1 | 3/2010 | McLean | |
| 2010/0077920 A1 | 4/2010 | Baksh et al. | |
| 2010/0089241 A1 | 4/2010 | Stoner et al. | |
| 2010/0212493 A1 | 8/2010 | Rasmussen et al. | |
| 2010/0251887 A1 | 10/2010 | Jain | |
| 2010/0252497 A1 | 10/2010 | Ellison et al. | |
| 2010/0263534 A1 | 10/2010 | Chuang | |
| 2010/0282593 A1 | 11/2010 | Speirs et al. | |
| 2010/0288704 A1 | 11/2010 | Amsden et al. | 210/688 |
| 2011/0031103 A1 | 2/2011 | Deckman et al. | |
| 2011/0146494 A1 | 6/2011 | Desai et al. | |
| 2011/0217218 A1 | 9/2011 | Gupta et al. | |
| 2011/0277629 A1 | 11/2011 | Manning et al. | |
| 2011/0296871 A1 | 12/2011 | Van Soest-Vercammen et al. | 62/636 |
| 2011/0308524 A1 | 12/2011 | Brey et al. | 128/205.12 |
| 2012/0024152 A1 | 2/2012 | Yamawaki et al. | |
| 2012/0031144 A1 | 2/2012 | Northrop et al. | |
| 2012/0067216 A1 | 3/2012 | Corma-Canos et al. | |
| 2012/0152115 A1 | 6/2012 | Gerds et al. | |

(56) References Cited

U.S. PATENT DOCUMENTS

| | | |
|---|---|---|
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2012/0255377 A1 | 10/2012 | Kamakoti et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0225898 A1 | 8/2013 | Sundaram et al. |

FOREIGN PATENT DOCUMENTS

| | | | |
|---|---|---|---|
| CA | 2 228 206 | 7/1998 | |
| CA | 2 297 590 | 8/2000 | |
| CA | 2 297 591 | 8/2000 | |
| CA | 2 237 103 | 12/2001 | |
| CA | 2 357 356 | 3/2002 | |
| CA | 2616701 | 2/2007 | ............ B01D 53/14 |
| EP | 0257493 | 2/1988 | |
| EP | 0426937 | 5/1991 | |
| EP | 1 004 341 | 5/2000 | |
| EP | 1004341 | 5/2000 | |
| EP | 1 018 359 | 7/2000 | |
| EP | 1018359 | 7/2000 | |
| EP | 1413348 | 8/2002 | |
| EP | 1577561 | 9/2005 | |
| EP | 1 203 610 | 12/2005 | |
| EP | 1203610 | 12/2005 | |
| EP | 1674555 | 6/2006 | ............ B01D 53/04 |
| EP | 1798197 | 6/2007 | |
| EP | 1045728 | 11/2009 | |
| JP | 58-114715 | 7/1983 | ............ B01D 53/50 |
| JP | 59-232174 | 12/1984 | |
| JP | 11-169640 | 6/1999 | ............ B01D 53/04 |
| JP | 2000024445 | 8/2001 | |
| JP | 2002348651 | 12/2002 | |
| JP | 2006016470 | 1/2006 | |
| JP | 2006036849 | 2/2006 | |
| JP | 4-180978 | 9/2008 | ............ H04N 7/173 |
| JP | 2008272534 | 11/2008 | ............ B01D 53/04 |
| WO | WO 99/43418 | 9/1999 | |
| WO | WO00/35560 | 6/2000 | |
| WO | WO02/073728 | 9/2002 | ............ H01M 8/06 |
| WO | WO2005/032694 | 4/2005 | |
| WO | WO2005/070518 | 8/2005 | |
| WO | WO2006/017940 | 2/2006 | |
| WO | WO2006/074343 | 7/2006 | |
| WO | WO 2007/111738 | 10/2007 | |
| WO | WO 2010/123598 | 10/2010 | |
| WO | WO 2010/130787 | 11/2010 | |
| WO | WO 2011/139894 | 11/2011 | |
| WO | WO2012/118755 | 9/2012 | |
| WO | WO2012/118757 | 9/2012 | |
| WO | WO2012/118758 | 9/2012 | |
| WO | WO2012/118759 | 9/2012 | |
| WO | WO2012/118760 | 9/2012 | |
| WO | WO2012/161826 | 11/2012 | |
| WO | WO2012/161828 | 11/2012 | |
| WO | WO2013/022529 | 2/2013 | |

OTHER PUBLICATIONS (Aug. 2008), "RCPSA Rapid Cycle Pressure Swing Adsorption, Advanced, Low-Cost Commericalized $H_2$ Recovery Process," ExxonMobil Upstream Research Company, 2 pgs.

U.S. Appl. No. 13/602,750, filed Sep. 4, 2012, Sundaram, N. et al.

Conviser, (1964) "Removal of CO2 from Natural Gas With Molecular Sieves," *Publication*, pp. 1F-12F.

ExxonMobil Research and Engineering and Xebec (2008) A New Commercialized Process for Lower Cost H2 Recovery—Rapid Cycle Pressure Swing Adsorption (RCPSA), *Brochure*.

ExxonMobil Research and Engineering and QuestAir (2008) RCPSA—Rapid Cycle Pressure Swing Adsorption—An Advanced, Low-Cost Commercialized H2 Recovery Process, *Brochure*, 2 pages.

GE Oil & Gas (2007) "Dry Gas Seal Retrofit," Florene, Italy, www.ge.com/oilandgas.

Farooq, et al. (1990) "Continuous Contercurrent Flow Model for a Bulk PSA Separation Process," *AIChE J.*, v36 (2) p. 310-314.

FlowServe "Exceeding Expectations, US Navy Cuts Maintenance Costs With Flowserve GX-200 Non-Contacting Seal Retrofits," *Face-to-Face*, v17.1.

Herrmann, et al. (2008) "Curvelet-Based Seismic Data Processing: A Multiscale and Nonlinear Approach," *Geophysics*, v73.1, pp. A1-A5.

Hopper, et al. (2008) "World's First 10,000 psi Sour Gas Injection Compressor," *Proceedings of the 37th Turbomachinery Symosium*, pp. 73-95.

Reyes, et al. (1997) "Frequency Modulation Methods for Diffusion and Adsorption Measurements in Porous Solids," *J. Phys. Chem. B.* v101, pp. 614-622.

Sahni, et al. (2005) "Multiresolution Wavelet Analysis for Improved Reservoir Description," SPE-87820, *Soc. of Petroleum Eng.—Reservoir Evaluation & Engineering*, pp. 53-69, (XP-002550569).

Stahley, (2003) "Design, Operation, and Maintenance Considerations for Improved Dry Gas Seal Reliability in Centrifugal Compressors," pp. 1-15.

Suzuki, (1985) "Continuous-Countercurrent-Flow Approximation for Dynamic Steady State Profile of Pressure Swing Adsorption" *AIChE Symp. Ser.* v81 (242) pp. 67-73.

Ruthven, D. M. et al. (1996) "Performance of a Parallel Passage Adsorbent Contactor," *Gas. Sep. Purif.*, vol. 10, No. 1, pp. 63-73.

Kikkinides, E. S. et al. (1995) "Natural Gas Desulfurization by Adsorption: Feasibility and Multiplicity of Cyclic Steady States," *Ind. Eng. Chem. Res.*, v. 34, pp. 614-622.

\* cited by examiner

APPARATUS AND SYSTEMS HAVING AN ENCASED ADSORBENT CONTACTOR AND SWING ADSORPTION PROCESSES RELATED THERETO

CROSS REFERENCE TO RELATED APPLICATIONS

This application is the National Stage entry under 35 U.S.C. 371 of PCT/US2012/026797 that published as Intl. Patent Application Publication No. 2012/118755 and was filed on 27 Feb. 2012, which claims the benefit of U.S. Provisional Application No. 61/448,117, filed on 1 Mar. 2011, each of which is incorporated by reference, in its entirety, for all purposes.

This application is related to U.S. patent application No. 61/448,120 entitled APPARATUS AND SYSTEMS HAVING A RECIPROCATING VALVE HEAD ASSEMBLY AND SWING ADSORPTION PROCESSES RELATED THERETO, filed Mar. 1, 2011; U.S. patent application No. 61/448,121 entitled METHODS OF REMOVING CONTAMINANTS FROM A HYDROCARBON STREAM BY SWING ADSORPTION AND RELATED APPARATUS AND SYSTEMS, filed Mar. 1, 2011; U.S. patent application No. 61/448,123 entitled APPARATUS AND SYSTEMS HAVING A ROTARY VALVE ASSEMBLY AND SWING ADSORPTION PROCESSES RELATED THERETO, filed Mar. 1, 2011; U.S. patent application No. 61/448,125 entitled APPARATUS AND SYSTEMS HAVING COMPACT CONFIGURATION MULTIPLE SWING ADSORPTION BEDS AND METHODS RELATED THERETO, filed Mar. 1, 2011, and U.S. patent application No. 61/594,824 entitled METHODS OF REMOVING CONTAMINANTS FROM A HYDROCARBON STREAM BY SWING ADSORPTION AND RELATED APPARATUS AND SYSTEMS, filed Feb. 3, 2012, each of which is herein incorporated by reference in its entirety.

FIELD OF THE INVENTION

Provided are encased parallel channel adsorbent contactor apparatus and systems and swing adsorption processes related thereto. More particularly, provided are one or more encased adsorbent contactors which are loaded and sealed together in a swing adsorption vessel such that substantially the entire feed stream should pass into the channels of the contactors and not through unintended gaseous stream paths between contactors.

BACKGROUND OF THE INVENTION

Gas separation is important in many industries and can typically be accomplished by flowing a mixture of gases over an adsorbent material in an adsorbent contactor that preferentially adsorbs more readily adsorbed components relative to less readily adsorbed components of the mixture. One of the more important types of gas separation technology is swing adsorption.

Users of swing adsorption hardware prefer to use large diameter beds to minimize the number of total beds for any given application. However, manufacture and installation of large diameter beds is a difficult engineering problem, which often results in a compromise design at a smaller diameter. As a result multiple beds are often needed to achieve the same process goal. This typically results in greater expense and a larger equipment footprint.

Conventional swing adsorption vessels contain a plurality of individual monolith adsorbent contactors within a cylindrical vessel. The monolith contactors have multiple substantially parallel gas flow channels running along the longitudinal axis of the contactor, with an adsorbent material lining the walls of the open channels. Various engineering problems limit the flow through capacity of such adsorption vessels. For example, larger contactors often provide unintentional and undesirable gaseous stream paths in regions between adjacent contactors. This creates a significant problem because it is difficult to maximize the monoliths process area, while providing a robust mechanical support and hold-down structure aimed at retaining the monoliths in place during the unit operating cycles.

There remains a need in the art for monolith designs that mitigate the above mentioned problems, especially those associated with undesirable gaseous steam paths between contactors.

Other related applications in the technical area include U.S. Patent Application Nos. 61/447,806, 61/447,812, 61/447,824, 61/447,848, 61/447,869, 61/447,835, and 61/447,877, each of which is herein incorporated by reference in its entirety.

SUMMARY OF THE INVENTION

Provided are encased parallel channel adsorbent contactor apparatus and systems and swing adsorption processes related thereto. Swing adsorption contactor systems include: a plurality of hollow rigid liners each having an inner surface and open axial ends, adjacent liners being fixedly connected to each other; a monolith adsorbent contactor being disposed within each liner, each monolith adsorbent contactor having an outer surface spaced from the inner surface of the liner; a bonding agent being disposed in the space between the outer surface of the monolith adsorbent contactor and the inner surface of the liner to form a seal to prevent gaseous flow in the space.

Also, in accordance with the present invention, a method of assembling a swing adsorption contactor system is provided that comprises the steps of: fixedly connecting a plurality of hollow rigid liners to each other, wherein each of the liners has an inner surface and open axial ends; placing a monolith adsorbent contactor within each liner, each monolith adsorbent contactor having an outer surface, wherein the placing step includes spacing the outer surface of each monolith adsorbent contactor from the inner surface of each liner; placing a bonding agent in the space between the outer surface of the monolith adsorbent contactor and the inner surface of the liner to form a seal to prevent gaseous flow in the space.

DETAILED DESCRIPTION OF THE INVENTION

Figure 1A:
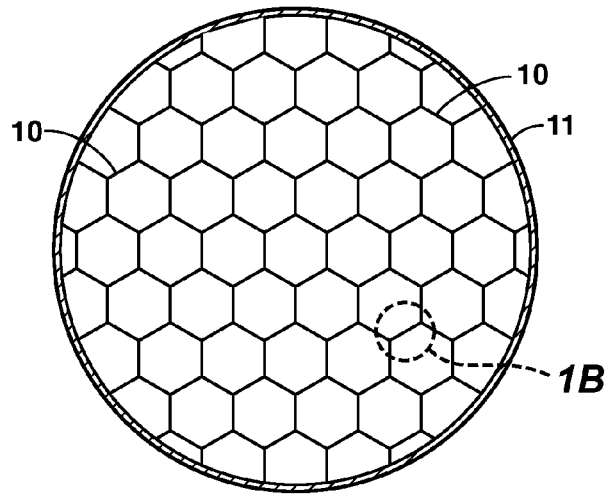
FIG. 1A hereof is a cross-sectional top view taken along line A-A of FIG. 2A hereof and shows a swing adsorption cylindrical vessel of the prior art containing a plurality of stacked hexagon shaped adsorbent contactors.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, will control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

Monolith adsorbent contactors are defined herein is a subset of adsorbent contactors comprising structured (engineered) adsorbents in which substantially parallel flow channels are incorporated into the adsorbent structure. These flow channels may be formed by a variety of means, including extruded ceramic monoliths, bundles of hollow fibers, spiral wound adsorbent layers, stacked layers of adsorbent sheets with and without spacers, and other methods. In addition to the adsorbent material, the structure may contain items such as, but not limited to, support materials, heat sink materials, void reduction components, and other materials. Exemplary contactors are described in U.S. Patent App. Pub. No. 2008/0282892, which is incorporated by reference herein.

This invention relates to an enhanced swing adsorption contactor system. This system includes monolith adsorbent contactor liners and the installation of a plurality of the liners into a cylindrical vessel or an irregular shaped containment boundary, preferably a swing adsorption vessel. There are several benefits of the present invention over the prior art. For example, the swing adsorption vessels can be optimized overall by limiting the cross sectional area of non-process material. The present invention also provides a means of achieving both accurate and repeatable fabrication and installation results. Further, the internal mechanical support and hold-down structures for an assembly of lined monolith contactors of the present invention are also simplified. The undesirable stray gaseous stream paths between contactors of conventional assemblies are substantially eliminated. Another benefit of the present invention over the prior art is providing a cost effective robust means of anchoring the monolith contactors in a gaseous process environment. Still another benefit of the present invention is providing a direct scale-up relationship between a smaller demonstration unit and the full size commercial unit. An individual adsorbent monolith having a metallic liner can be equal in size for both given applications.

The lined monolith adsorbent contactors of the present invention can also be constructed to accommodate numerous geometric shapes without the need of relying on specialized fabrication tools, assembly techniques or industry know-how. The contactor liners of the present invention can be made from any suitable material that is able to withstand the operating conditions and environment of their intended use, preferably swing adsorption conditions. Such conditions include temperatures up to 100° C. and pressures up to 1200 pounds per square inch absolute (psia) (8274 kilo Pascal absolute (kPaa)). Stainless steels are the most preferred materials for use as liners of the present invention. The wall thickness of the liners of the present invention may be from about 3/32 to 3/16 inch (in) (0.02381 to 0.004762 meters (m)), preferably from ⅛ to ¼ in (0.003175 to 0.000625 m), and more preferably from 1/16 to ⅛ in (0.001587 to 0.003175 m). The liners of the present invention can be brake-bent from flat plate or can begin with commercially available shaped pipe with post fabrication steps.

Figure 1B:
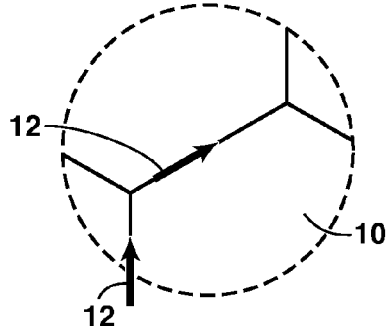
FIG. 1B hereof is an enlarged view of a section of the view of FIG. 1A hereof showing undesirable gaseous flow paths between adsorbent contactors.
Figure 2A:
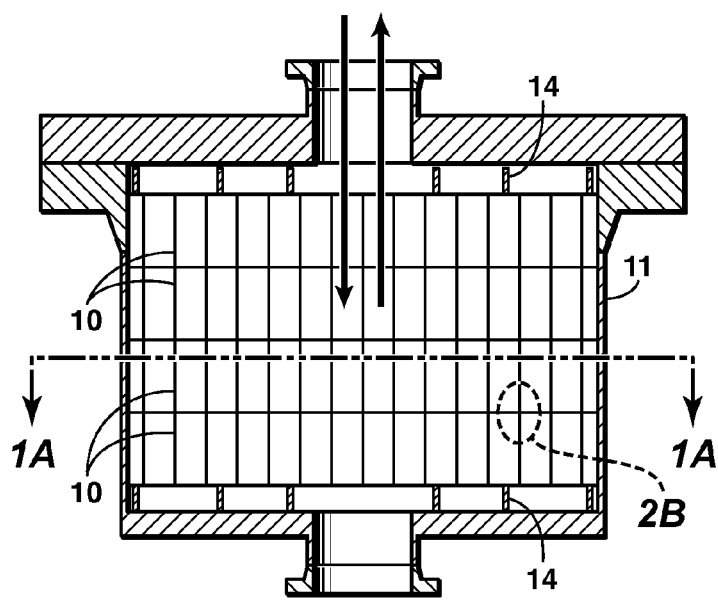
FIG. 2A hereof is a side cross-sectional view of a swing adsorption cylindrical vessel of the prior art showing the stacking of the adsorbent contactors and a means for hold-down and support.
Figure 2B:
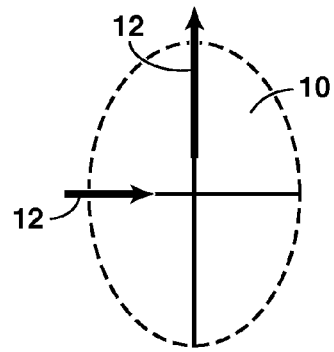
FIG. 2B hereof is an enlarged view of a section of the bundle of stacked adsorbent contactors of view 2A hereof showing undesirable gaseous paths between adsorbent contactors.

This invention can be better understood with reference to the figures hereof FIGS. 1A and 1B illustrate conventional practice for stacking a plurality of catalyst substrates or monolith adsorbent contactors in a pressure vessel 11. FIG. 1A shows a top cross-sectional view showing contactors 10 for this arrangement in the vessel 11. FIG. 1B is an enlarged view of a section 1B of the plurality of the contactors and shows how an undesirable gaseous path 12 can form in the space between contactors. The term "space" means a region or volume, which may be bounded by one or more objects. In this manner, a portion of the gas stream may bypass the contactors or desired process area within the contactors. This undesired path degrades the performance or efficiency of the system and operation of a process (e.g., lessen purity of the respective streams in the process). FIG. 2A hereof is a cross-sectional view along the vertical axis of a typical pressure vessel 11 containing an assembly of stacked monolith adsorbent contactors 10. Also shown are mechanical hold-down and support structures 14. FIG. 2B is an enlarged view of a section 2B of the assembly of contactors showing an undesirable gaseous path 12 between contactors that is a potential defect in conventional monolith adsorbent contactor assemblies. Even if the individual monolith adsorbent contactors are bonded together with glue or cement, it is difficult to verify the effectiveness of the bond and determine whether all the undesirable gas flow paths have been eliminated. Furthermore, the mechanical hold-down and support structures 14 transmit forces directly to the faces of the individual monolith adsorbent contactors, which in many cases do not have the mechanical integrity to withstand the forces encountered during rapid cycle swing adsorption processes.

Figure 3:
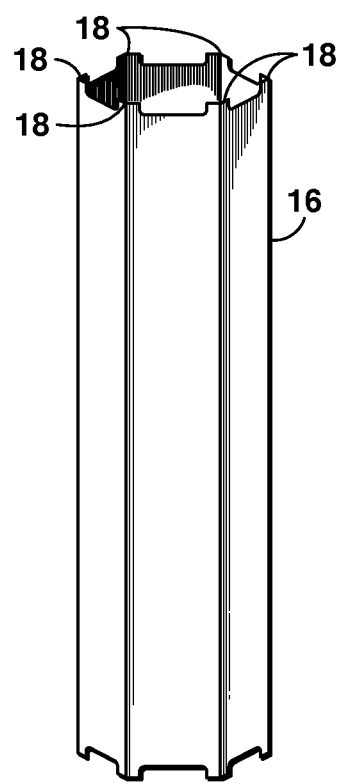
FIG. 3 hereof is a side elevated view of a formed metallic contactor liner for a corresponding formed adsorbent monolith contactor of the present invention.
Figure 4:
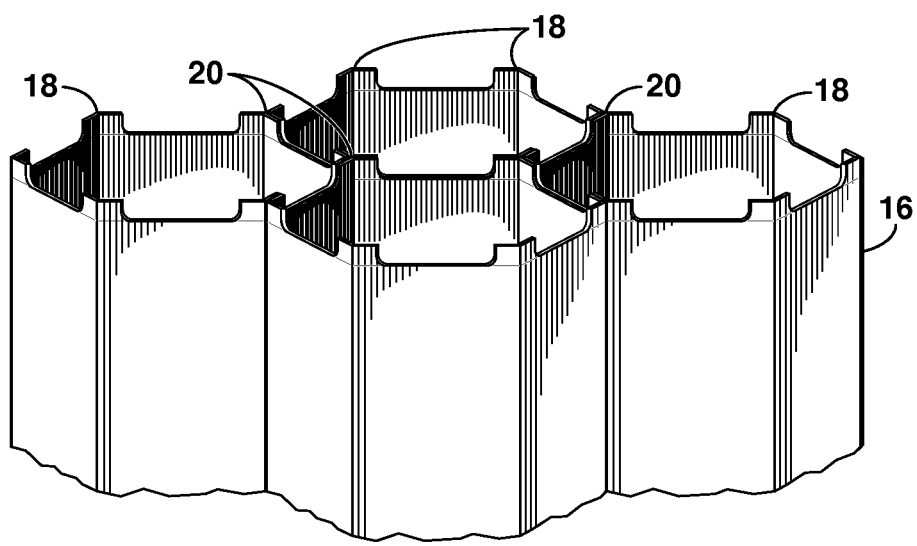
FIG. 4 hereof is a side elevated view of four formed metallic contactor liners of the present invention stacked together side by side.

FIGS. 3 and 4 hereof show a hollow rigid liner, which may include as a non-limiting example a metallic liner 16, in the shape of a hexagonal tube. Liner 16 wraps the external non-process surface of each individual monolith adsorbent contactor with a thin metallic skin, which provides a substantially uniform annular space between the inner surface of the metallic liner 16 and the monolith adsorbent contactor for a monolithic anchoring system. The extreme ends of the metallic liner have integrated stand-offs 18 that project in the axial direction as better shown in the enlarged view of FIGS. 4 and 7. These formed ends or stand-offs 18 provide a consistent means of spacing the monolith's process face from the pressure vessels inner horizontal surfaces. The benefit of the metallic liner 16 and standoffs 18 is that forces are distributed to the large external non-process surface of each individual monolith adsorbent contactor, rather than the inlet and outlet faces containing the gas flow channels as in the prior art. Accordingly, the adsorbent contactor assembly is much more capable of withstanding the large forces applied to the adsorbent contactor assembly during rapid cycle swing adsorption processes. A further benefit is that the formed ends also provide a uniform means of cross sharing or distributing the gaseous process streams between all monoliths.

Figure 7:
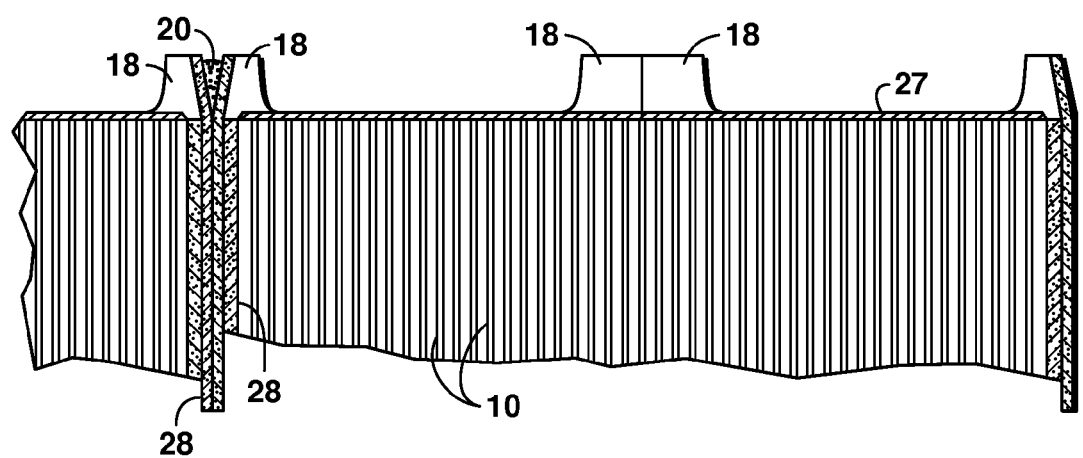
FIG. 7 hereof is a partial side cross-sectional view of the top section of a plurality of monolith liners of the present invention secured together and showing the placement of a bonding agent, weld, and paraffin pad used during the bonding step.

The individual metallic liners can be deployed into an assembly fixture jig (not shown), which represents the inside geometry of the intended pressure boundary (e.g., which may be similar to the pressure vessel 11). The design shown in these figures (see FIGS. 4, 5B and 7, for example) offers a substantially uniform location between all adjacent liners, which are fixedly connected to each other for a robust seal. As a non-limiting example of being fixedly connected, a seal weld 20 is located between all adjacent stand-offs 18. The weld 20 has a dual purpose of securing each independent metallic liner 16 to one another, in addition to providing a reliable seal weld that substantially eliminates gaseous stream paths between liners. The weld seam can be bonded by techniques known in the art. Non-limiting examples of techniques suitable for fixedly connecting include bonding the welds of the present invention via gluing, brazing and tinning. A separate multi-sided channel material can also be added with a bonding technique over the resulting butt seam (not shown) that joins each adjacent liner. FIG. 4 hereof shows an assembly of four metallic liners of the present invention and the location of the seal weld 20 between stand-offs 18. FIG. 7 shows an enlarged view of the seal weld 20 between adjacent stand-offs 18.

Figure 5A:
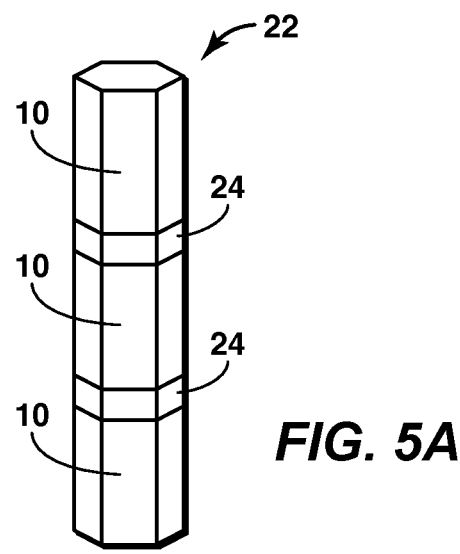
FIG. 5A hereof shows three monolith adsorbent contactors of the present invention stacked on top of each other and secured to one another for placement into a liner of a plurality of liners secured together side by side.
Figure 5B:
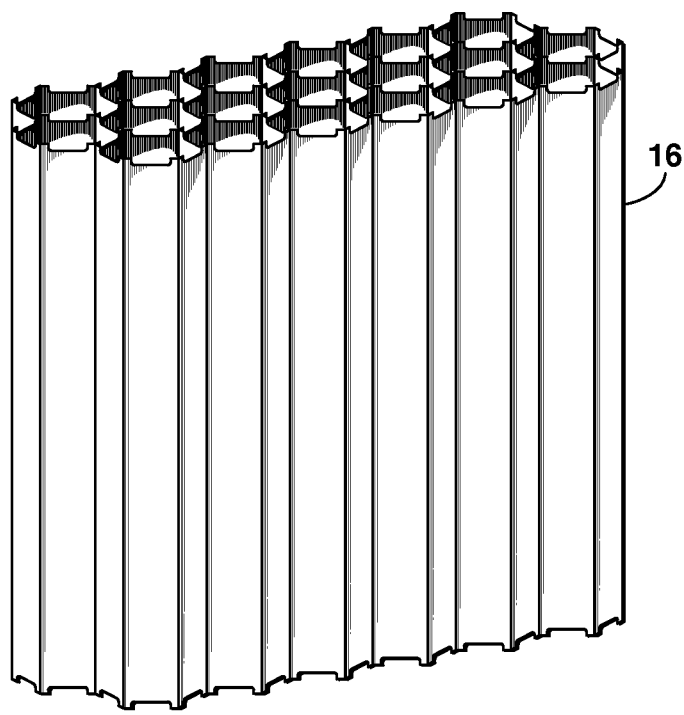
FIG. 5B hereof shows a top elevated view of an array of monolith contactor liners.

FIG. 5A hereof shows a stack 22 of three monolith adsorbent contactors 10, which are held together by preferably, but not limited to, a tape 24, preferably a tape comprised of a metal foil at each face-to-face junction. The tape ensures that the channels along the fact-to-face junction do not become plugged or blocked during the gluing step. Foil coated tape is preferred because it provides additional protection since it most likely does not adsorb the glue, or bonding agent. Any number of monolith contactors can be stacked together depending on the height of the liner 16 for the intended adsorbent bed height. The monolith assembly begins with a plurality of monolith contactors, stacked to a desired vertical depth and having foil tape at each face-to-face junction. FIG. 5B hereof is a top perspective view of a liner/monolith contactor assembly before any of the stacked monolith adsorbent contactors 10 are placed therein. As shown in FIG. 5B, each liner of the plurality of hollow rigid liners 16 has an inner surface that defines an interior region, a first open axial end along a longitudinal axis, a second open axial end along the longitudinal axis opposite the first open axial end, and an outer surface external to the interior region. Also, as shown in FIG. 5A, each of the monolith adsorbent contactors 10 have a body that defines at least one passage through the body along the longitudinal axis and an outer surface of the body.

Figure 6:
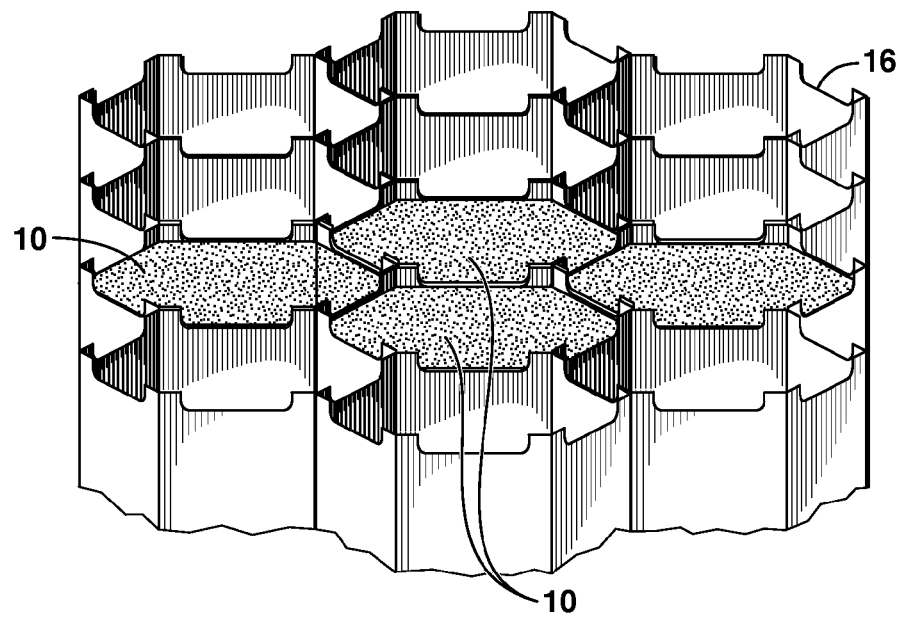
FIG. 6 shows a top elevated view of an array of monolith contactor liners, four of which contain monolith adsorbent contactors.

FIG. 6 shows a top perspective view of a liner/monolith contactor assembly with four of the stacked monolith contactors placed therein. It is noted that liners 16 and monolith adsorbent contactors 10 are manufactured so that a number of monoliths fit inside of each liner so that only the stand-offs 18 at each end of the liner extend past the face of the monolith contactor. As shown in FIG. 6, four of the plurality of liners 16 have a monolith adsorbent contactor disposed within the respective liners. A bonding agent (not shown) is disposed between the outer surface of the respective monolith adsorbent contactor and the respective inner surface of the liner to hinder gaseous flow between the monolith adsorbent contactor and the hollow rigid liner.

FIG. 7 hereof is a partial side cross-sectional view of a top section of a monolith contactor assembly of the present invention. The monolith adsorbent contactor 10 in the overall assembly is preferably concentrically positioned within the formed metallic liner 16. This geometry provides a uniform annular gap for a monolithic anchoring system. The exposed process face of each monolith is coated with a layer 27 of low melting material, preferably a paraffinic material to protect the monolith contactor process areas when a viscous bonding agent 28 is poured into the annular space and which is ultimately cured to form a semi-rigid but flexible anchoring system for the overall assembly.

Figure 8:
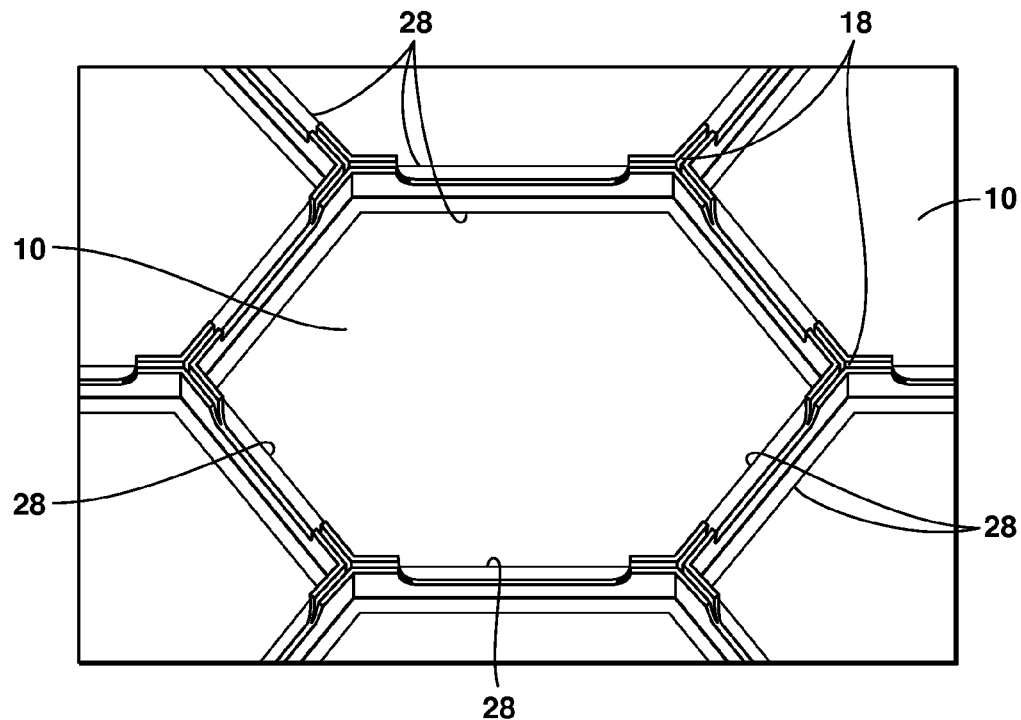
FIG. 8 hereof is an enlarged top section of a monolith contactor assembly of the present invention showing boding agent between the monolith and liner.

FIG. 8 hereof shows an enlarged top section of a monolith contactor assembly of the present invention showing bonding agent 28 between the monolith adsorbent contactor 10 and liner 16. The combination of the seal weld seam 20 and semi-rigid anchoring system mitigates all or substantially reduces unwanted and undesirable gaseous stream paths. A further advantage of this embodiment is the ability to test each liner and monolith assembly for pressure integrity to ensure that the bonding agent has fully sealed the annular gap between the liner and the monolith adsorbent contactor. While the layer of low melting material is still present to block the gas flow channels within the monolith adsorbent contactor, the liner and monolith adsorbent contactor assembly can be pressure tested to ensure that each liner assembly is properly constructed. This capability is not provided in conventional assemblies of monolith adsorbent contactors.

The bonding agent may be a polymer-based composition, e.g., thermoplastic and thermosets, adhesive compositions, such as contact adhesives or hot melt adhesives, rubber, i.e., natural or synthetic, elastomers, or combination thereof. Also, the bonding agent may include a heavy petroleum wax (e.g. Apiezon), bitumen, asphalt, etc. and the like.

Figure 9:
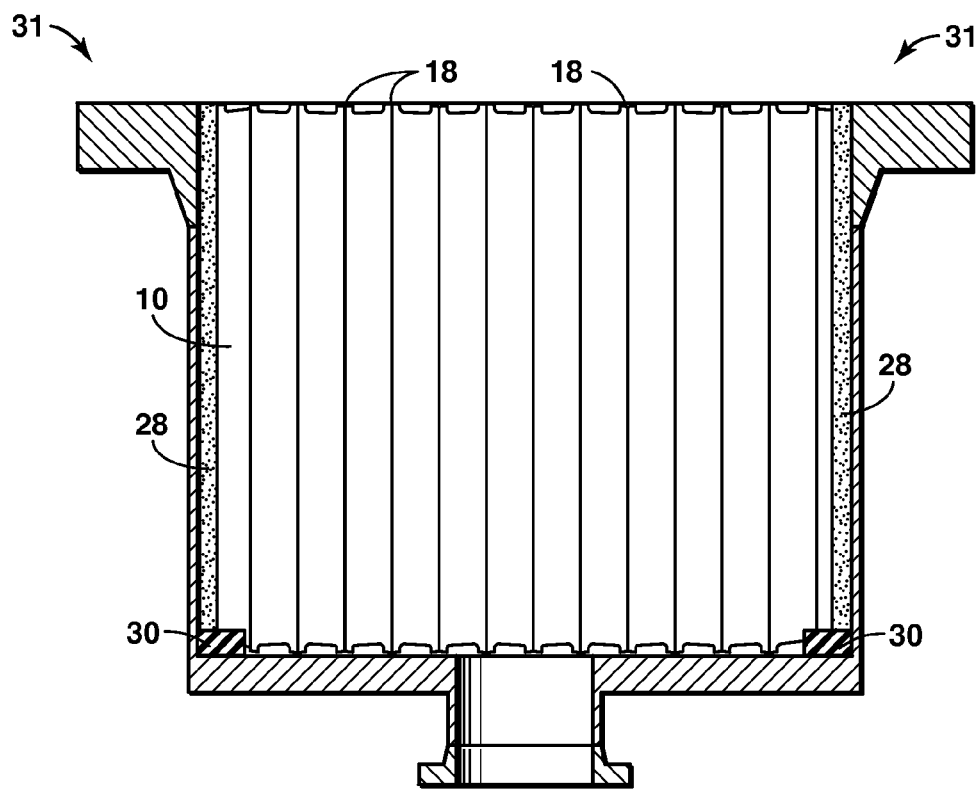
FIG. 9 hereof is a side cross-sectional view of a swing adsorption reaction vessel containing an assembly of lined monolith contactors and how they are secured to the interior of the vessel.

Once the assembly is removed from the fixture jig, it can be concentrically positioned in the pressure vessel. The annular gap between the pressure vessel inside surface and the assembly outermost material can be filled in a similar manner with a viscous bonding agent, as one example. The dispensable paraffin can be melted and drained from the pressure vessel to expose the axial ends of the monolith adsorbent contactor 10 in the assembly. The resulting exemplary monolith contactor assembly is shown in FIG. 9 hereof positioned within a swing adsorption vessel 31. FIG. 9 also shows a soft paraffinic ring 30 installed at the bottom of the vessel onto which the monolith assembly is lowered. This paraffinic ring 30 is provided to deform under the weight of the monolith assembly and provides a temporary seal which prevents the bonding agent 28 from traveling beyond its intended annular space. After the bonding agent has been positioned in the annular space, the paraffinic ring 30 can be melted and drained from the vessel. The term "paraffinic" as used herein means any suitable waxy material, both natural and synthetic. Natural waxes are waxes derived from animal, insect, mineral/petroleum, and vegetable sources. Non-limiting examples of waxes that are suitable for being recovered in the process of the present invention include: insect and animal waxes, preferably beeswax, Chinese insect wax, wool wax, and spermaceti; vegetable waxes, such as candelilla, carnauba, candelilla, Japan wax, ouricury wax, rice-bran wax, jocoba, castor wax, and bayberry wax; mineral waxes, such as montan wax, peat wax, ozokerite and ceresin waxes; petroleum waxes, such as paraffin and microcrystalline waxes; and synthetic waxes, such as polyethylene waxes, and mixtures thereof. It is also within the scope of this invention that the spacing can be provided by the use of physical protrusions (not shown) instead of the use of a wax. Crystals of a suitable material like tublimate could also be used to form the space, then dissolved away to leave the desired space. In addition, other materials may be utilized that can be easily burned or oxidized away, such as paper or cellulose, or even low temperature melting metals, such as tin, Wood's metal, or Field's metal. Similarly, low temperature melting metals can be used as the sealing agent instead of organic materials.

Figure 10:
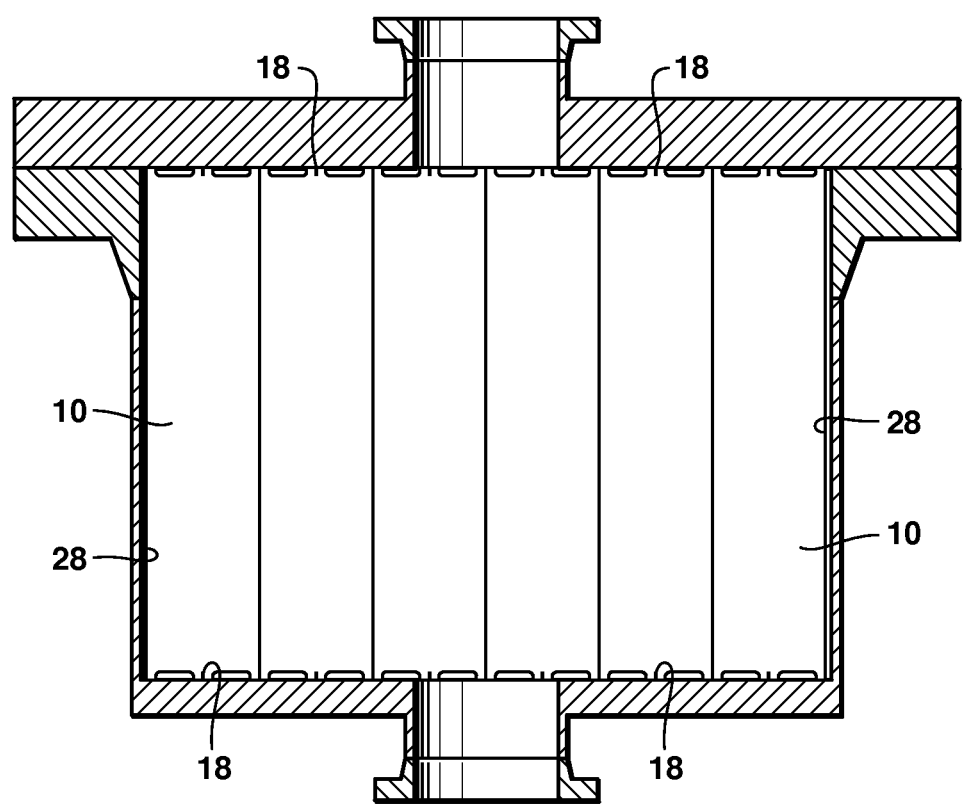
FIG. 10 hereof is a cross-sectional view along the vertical axis of a cylindrical swing adsorption vessel containing an assembly of encased monolith adsorbent contactors of the present invention.

FIG. 10 hereof is a cross-sectional view along the vertical axis of a cylindrical swing adsorption vessel containing an assembly of encased monolith adsorbent contactors 10 of the present invention. This figure shows the mechanical hold-down and support structure, such as stand-offs 18, which is an integral part of the monolith liners. As discussed previously, this integral support structure provides uniform distribution of forces to secure the assembly of monolith adsorbent contactors to the pressure vessel with maximum structural integrity. Additionally, the flow passages formed between the standoffs 18 and the vessel 31 create the means for uniform flow distribution to the assembly of monolith adsorbent contactors.

Figure 11A:
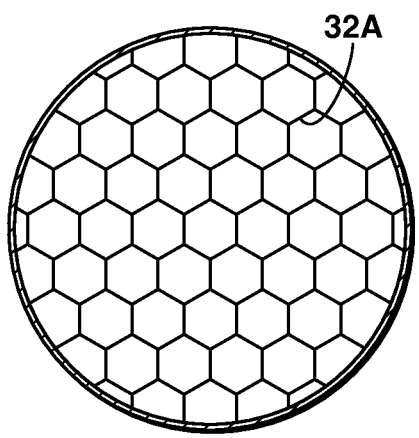
FIGS. 11A through 11F are cross-sectional views along a horizontal plane of a swing adsorption vessel containing monolith assemblies that have a variety of non-limiting examples of geometric shapes for the monoliths and monolith liners according to different embodiments of the present invention.
Figure 11B:
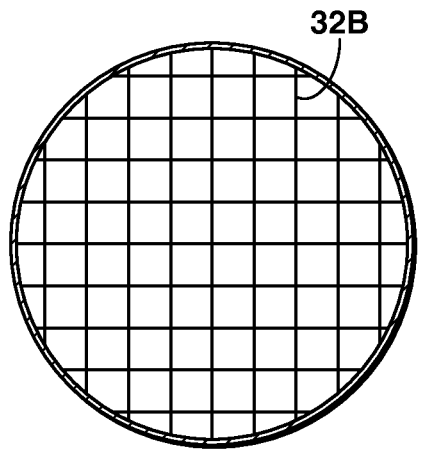
Figure 11C:
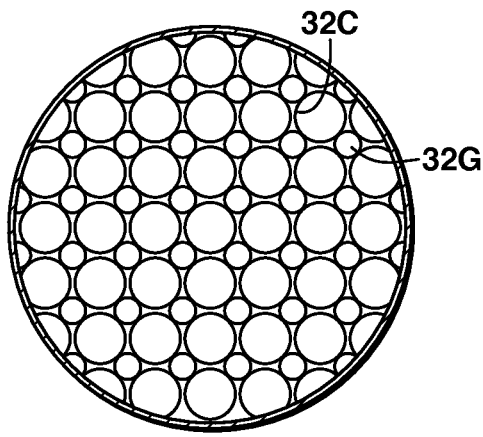
Figure 11D:
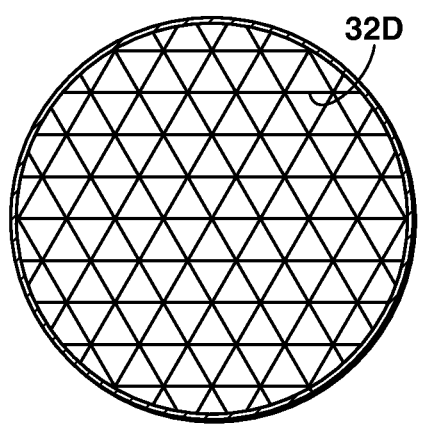
Figure 11E:
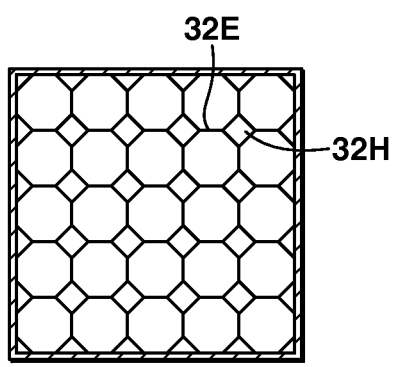
Figure 11F:
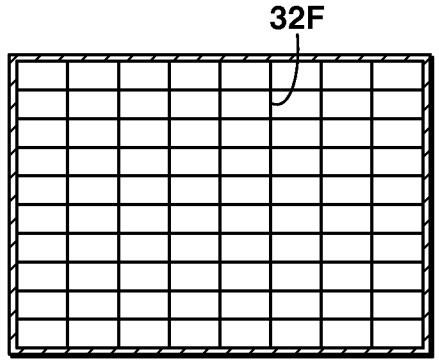

FIGS. 11A through 11F show cross-sectional views along a horizontal plane of a swing adsorption vessel containing monolith assemblies have a variety of non-limiting examples of geometric shapes 32A-32H that the monoliths and monolith liners of the present invention can take. The individually lined monolith can be formed to any geometric shape, which ideally fits into a specified pressure vessel boundary. For example, FIG. 11A includes various hexagonal shaped hollow-rigid liners and contactors, while FIG. 11B includes various square shaped hollow-rigid liners and contactors. FIG. 11D includes various triangular shaped hollow-rigid liners and contactors, while FIG. 11F includes various rectangular shaped hollow-rigid liners and contactors. Further, a uniform shape can be deployed or a combination of geometric shapes can be mixed to form the overall monolith process area. As exemplary embodiments, FIGS. 11A, 11B, 11D and 11F have liners having substantially uniform geometric shapes, while FIGS. 11C and 11E have liners of different geometric sizes and/or shapes. Specifically, FIG. 11C includes various circular shaped hollow-rigid liners and contactors of different diameters, while FIG. 11E includes various square shaped hollow-rigid liners and contactors and various hexagonal shaped hollow-rigid liners and contactors, which have different cross sectional areas. As may be appreciated, different geometric shapes may be utilized for different embodiments. For instance, the configuration may be utilized to maximize the process area for streams flowing through the vessel.

The provided adsorbent contactors are useful in adsorptive kinetic separation processes, apparatus, and systems for development and production of hydrocarbons, such as gas and oil processing. Particularly, the provided processes, apparatus, and systems are useful for the rapid, large scale, efficient separation of a variety of target gases from gas mixtures.

The provided adsorbent contactors described above are useful in swing adsorption processes. Non-limiting swing adsorption processes include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes such as pressure/temperature swing adsorption.

PSA processes rely on the phenomenon of gases being more readily adsorbed within the pore structure or free volume of an adsorbent material when the gas is under pressure, i.e., the higher the gas pressure, the greater the amount readily-adsorbed gas adsorbed. When the pressure is reduced, the adsorbed component is released, or desorbed.

PSA processes may be used to separate gases of a gas mixture because different gases tend to fill the micropore of the adsorbent to different extents. If a gas mixture, such as natural gas, is passed under pressure through a vessel containing a polymeric or microporous adsorbent that is more selective towards carbon dioxide than it is for methane, at least a portion of the carbon dioxide may be selectively adsorbed by the adsorbent, and the gas exiting the vessel may be enriched in methane. When the adsorbent reaches the end of its capacity to adsorb carbon dioxide, it is regenerated by reducing the pressure, thereby releasing the adsorbed carbon dioxide. The adsorbent is then typically purged and repressurized and ready for another adsorption cycle.

TSA processes rely on the phenomenon that gases at lower temperatures are more readily adsorbed within the pore structure or free volume of an adsorbent material compared to higher temperatures, i.e., when the temperature of the adsorbent is increased, the adsorbed gas is released, or desorbed. By cyclically swinging the temperature of an adsorbent bed, TSA processes can be used to separate gases in a mixture when used with an adsorbent that is selective for one or more of the components of a gas mixture.

Swing adsorption processes typically take place in a vessel containing one or more adsorbent beds. In multi-bed systems each bed may undergo a different step in an adsorption cycle, such as an adsorption step, one or more depressurization/desorption steps, one or more blow-down steps, and one or more repressurization steps. The flow of fluid to and from each bed is typically controlled by a valve, such as a poppet valve and/or a rotary valve assembly.

The provided processes, apparatus, and systems may be used to prepare natural gas products by removing contaminants and heavy hydrocarbons, i.e., hydrocarbons having at least two carbon atoms. The provided processes, apparatus, and systems are useful for preparing gaseous feed streams for use in utilities, including separation applications such as dew point control, sweetening/detoxification, corrosion protection/control, dehydration, heating value, conditioning, and purification. Examples of utilities that utilize one or more separation applications include generation of fuel gas, seal gas, non-potable water, blanket gas, instrument and control gas, refrigerant, inert gas, and hydrocarbon recovery. Exemplary "not to exceed" product (or "target") gas specifications include: (a) 2 vol. % $CO_2$, 4 ppm $H_2S$, (b) 50 ppm $CO_2$, 4 ppm $H_2S$, or (c) 1.5 vol. % $CO_2$, 2 ppm $H_2S$.

The provided processes, apparatus, and systems may be used to remove acid gas from hydrocarbon streams. Acid gas removal technology becomes increasingly beneficial as remaining gas reserves exhibit higher concentrations of acid gas, e.g., sour gas resources. Hydrocarbon feed streams vary widely in amount of acid gas, such as from several parts per million acid gas to 90 vol. % acid gas. Non-limiting examples of acid gas concentrations in natural gas from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$. For these streams, the hydrocarbons may include remaining portions of the total volume of the stream.

Figure 12:
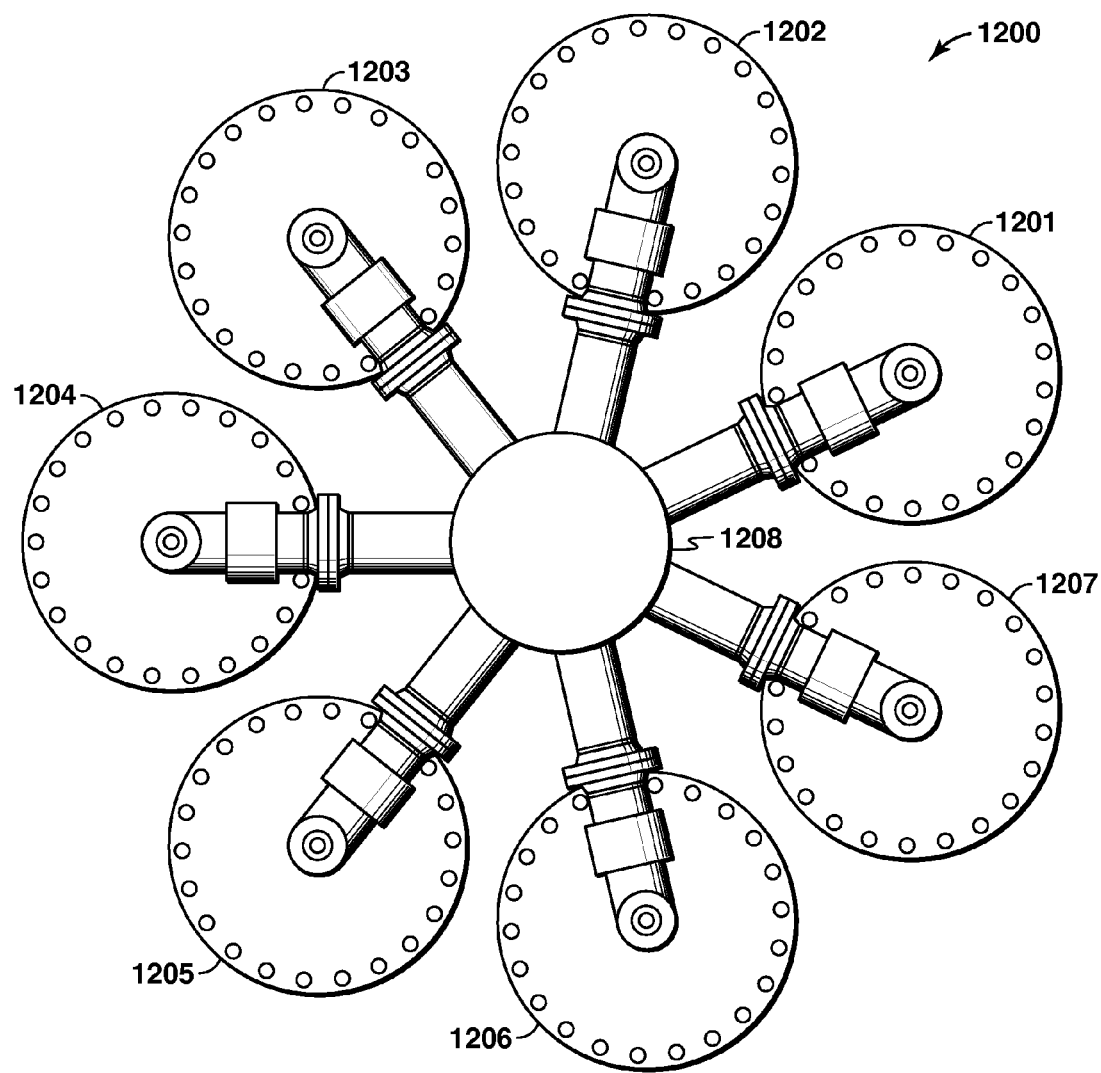
FIG. 12 is an illustration of an elevation view of an exemplary hydrocarbon treating apparatus comprised of a swing adsorption system with 14 adsorbent bed assemblies arranged in two levels of seven beds equally spaced around the central valve and flow distribution assembly.
Figure 13:
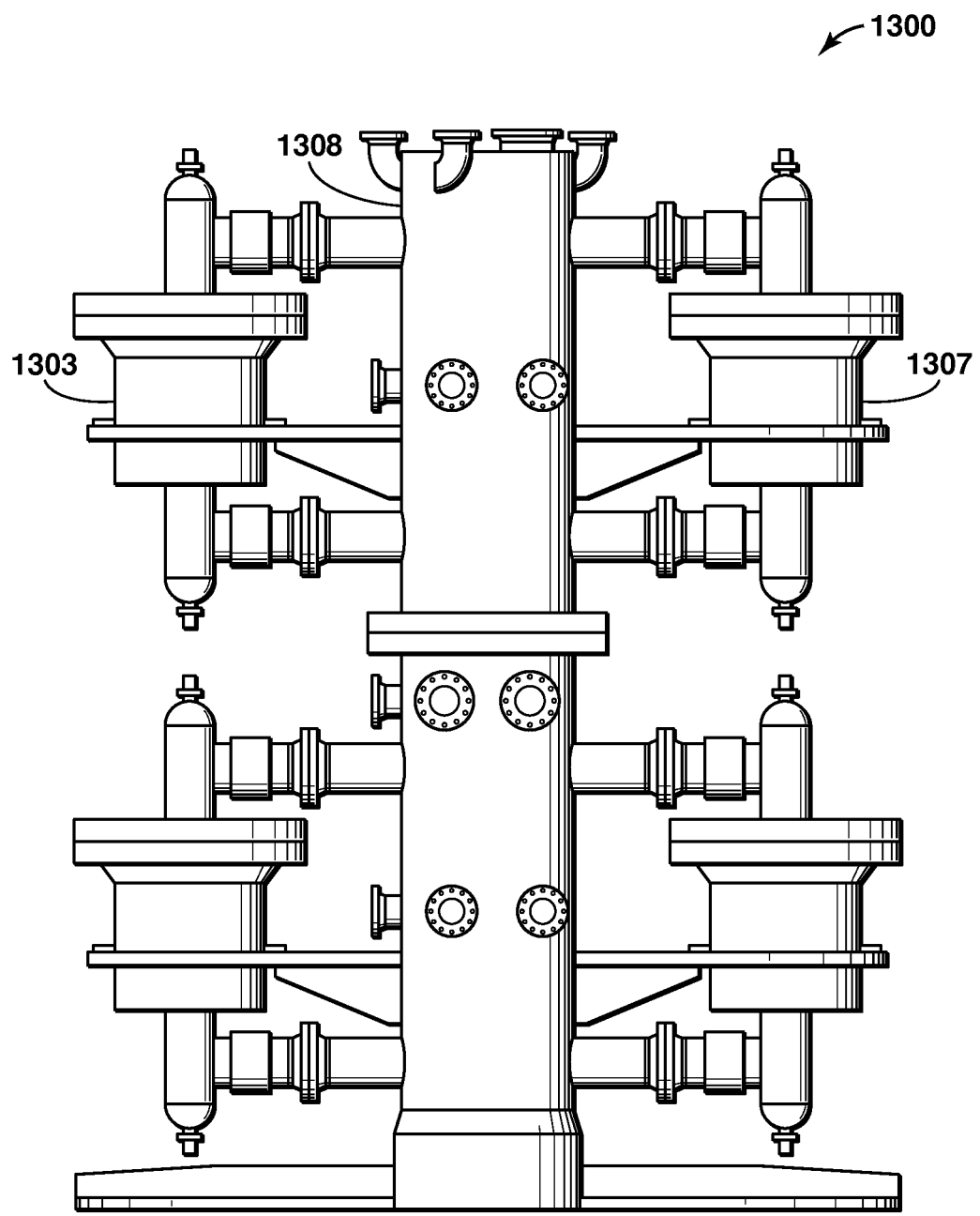
FIG. 13 is an illustration of a plan view of an exemplary hydrocarbon treating apparatus comprised of a swing adsorption system with 14 adsorbent bed assemblies arranged in two levels of seven beds equally spaced around the central valve and flow distribution assembly.

An exemplary hydrocarbon treating apparatus is shown in FIGS. 12 and 13. FIG. 12 is a top view of the swing adsorption system 1200, while FIG. 13 is a partial side view of the swing adsorption system 1300 with certain adsorbent bed assemblies omitted for simplicity. This apparatus is a compact swing adsorption system 1200 with fourteen adsorbent bed assemblies. The fourteen adsorbent bed assemblies are stacked two layers with the top adsorbent bed assemblies 1201-1207 being illustrated in FIG. 12. A rotary valve assembly 1208 is concentrically located in a cylindrical housing with a rotary valve, which is positioned equidistant to the enjoined adsorbent bed assemblies. The cylindrical housing further acts as a means of supporting a plurality of such adsorbent bed assemblies, conduits and valves in a multi-tier level arrangement. Gaseous streams are transferred through a given adsorbent bed by way of both the central rotary valve and one or more reciprocating valves located on the vessel heads. The gaseous stream has bi-directional travel between the ports of either of the reciprocating or rotary valves through a fixed conduit. The transfer duration of subsequent gaseous streams is limited and directed by the predetermined adsorption cycle.

Another feature of the apparatus shown in FIGS. 12 and 13 relates to a method of coordinating the activation mechanism of the reciprocating valve to either open or close at several predetermined physical locations on the rotary valve itself. In the present embodiment, a reliable and repeatable means of replicating precise operable coordination between the open or closed ports of the respective valves is provided for the adsorption cycle. This embodiment uses a traveling magnet assigned as a transmitter location, which is aligned to a fixed magnetic assigned as a receiving location. A generated flux signal between the magnets activates a specified mechanized driver of a given reciprocating valve for a specified duration. The art of generating and reading the change in a magnetic flux signal is scientifically recognized as the Hall Effect. The hydrocarbon treating apparatus shown in FIGS. 12 and 13 can be implemented in many different configurations.

Figure 14:
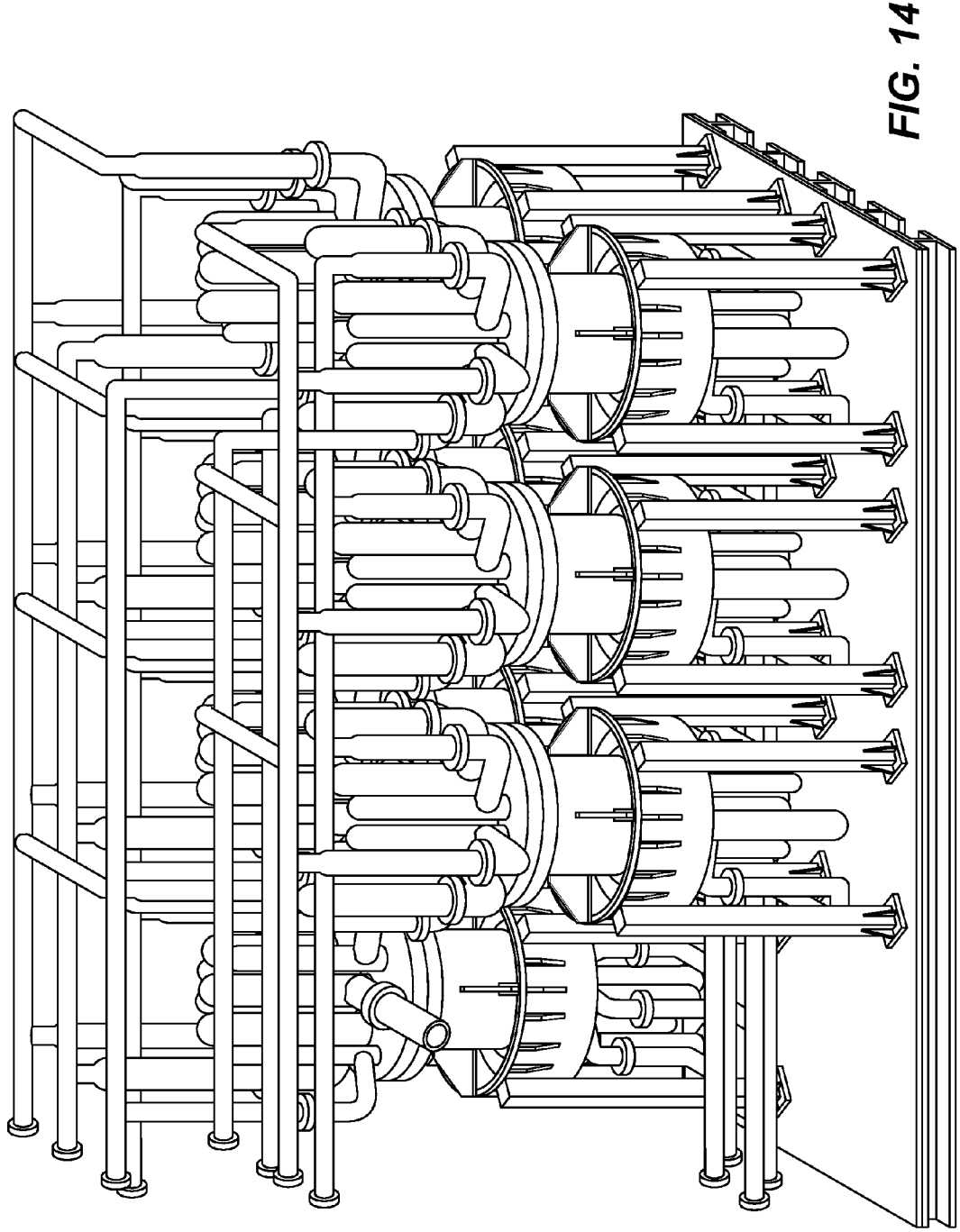
FIG. 14 is a three-dimensional diagram of another exemplary hydrocarbon treating apparatus comprised of a swing adsorption system with seven adsorbent bed assemblies arranged in two rows.

One possible alternative embodiment is shown in FIGS. 14, 15A, 15B, 15C, 16, 17A, 17B and 17C. In this embodiment, the fourteen individual adsorbent bed assemblies may be arranged in two skids, each of the skids containing seven of the individual adsorbent bed assemblies arranged in two rows. One of the exemplary skids is shown in FIG. 14. Multiple reciprocating (or poppet) valves are arranged on the top and bottom of each vessel and connected via piping and headers above and below the adsorbent bed assemblies.

Figure 15A:
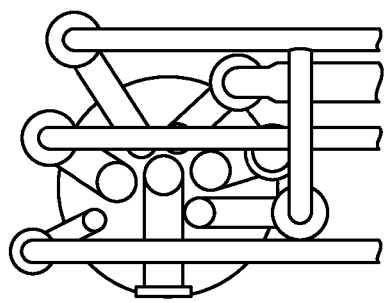
FIGS. 15A, 15B, and 15C are top, side, and bottom views, respectively, of an individual adsorbent bed assembly from the exemplary hydrocarbon treating apparatus in FIG. 14.
Figure 15B:
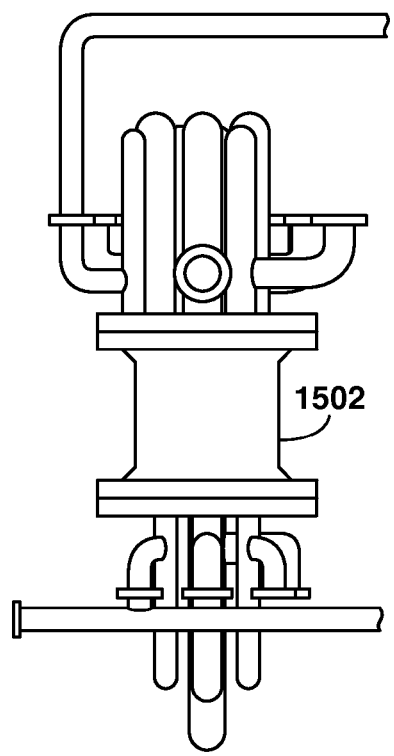
Figure 15C:
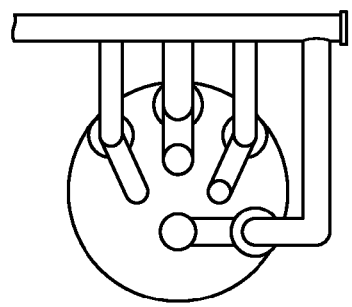

An individual adsorbent bed assembly is shown in FIGS. 15A-15C. As shown in the side view of FIG. 15B, various feed piping may pass the gaseous feed stream to the adsorbent bed assembly 1502 and the product stream may be removed via the bottom piping. The feed gas enters and exhaust gas exits through the piping and valves on the top of the vessel as shown in the top view of FIG. 15A. Product gas exits the adsorbent vessel through one of the valves and piping systems on the bottom of the vessel as shown in the bottom view in FIG. 15C. Other equalization and purge valves and piping are also included in FIGS. 15A-15C.

Figure 16:
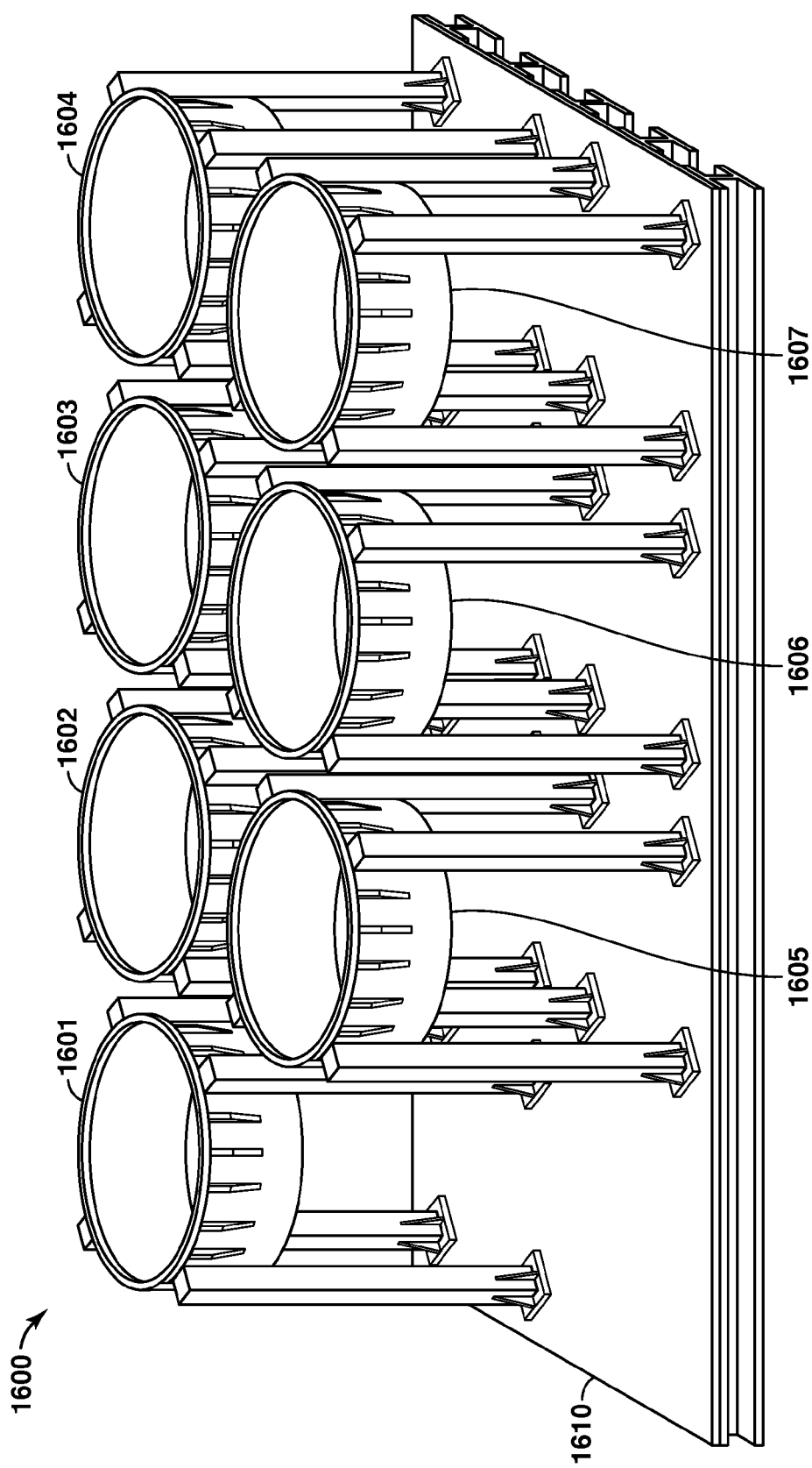
FIG. 16 is a three-dimensional diagram of individual adsorbent bed support structures attached to the skid base for the exemplary hydrocarbon treating apparatus of FIG. 14.

Each adsorbent bed assembly can be first fitted with the requisite reciprocating valves and then placed in the bed support structure 1601-1607 mounted on the skid 1610, which is shown in FIG. 16. Once the seven adsorbent bed assemblies are set in their respective support structure 1601-1607, the bed assemblies can be interconnected via piping and headers. The bed support structures 1601-1607 may be configured to permit movement to allow for thermal expansion or contraction of the piping system associated with the bed assembly. While the individual bed support structures 1601-1607 are fixed to the skid base 1610, the adsorbent bed assemblies, which are noted in other figures, may be disposed into the bed support structure 1601-1607 without being rigidly attached or securely fixed. Therefore, the entire adsorbent bed assembly can move freely within the bed support structure to accommodate thermal expansion or contraction of the piping and minimize stresses on the piping and valves.

Figure 17A:
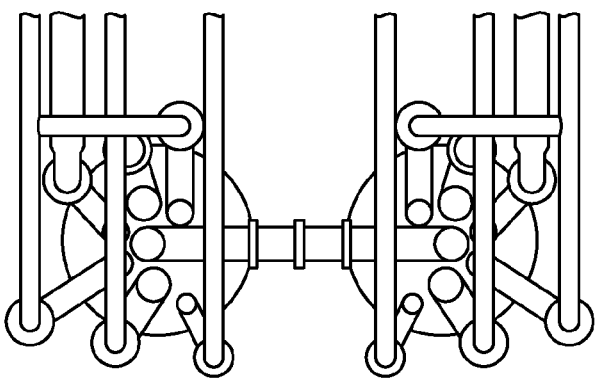
FIGS. 17A, 17B, and 17C are top, side, and bottom views, respectively, of a pair of individual adsorbent bed assemblies with interconnecting piping and bed support structures for the exemplary hydrocarbon treating apparatus in FIG. 14.
Figure 17B:
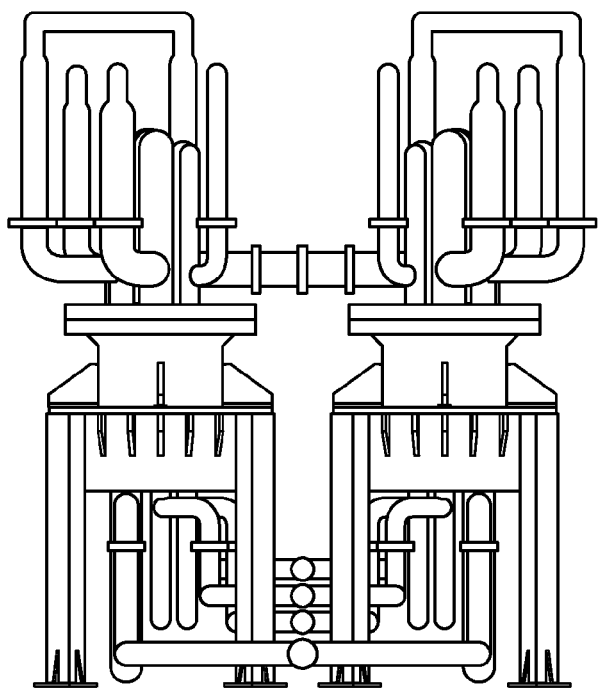
Figure 17C:
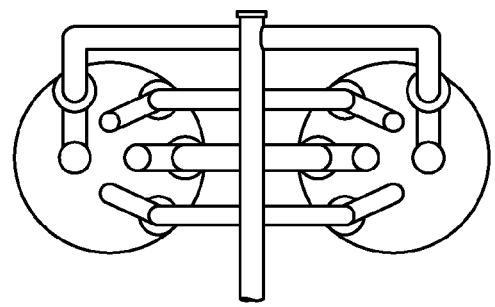

FIGS. 17A-17C provides different views of two bed assemblies. For instance, a top view of two interconnected beds is shown in FIG. 17A, a bottom view of two interconnected bed assemblies is shown in FIG. 17C, and a side view of the interconnected bed assemblies in the support structure is shown in FIG. 17B.

Figure 18:
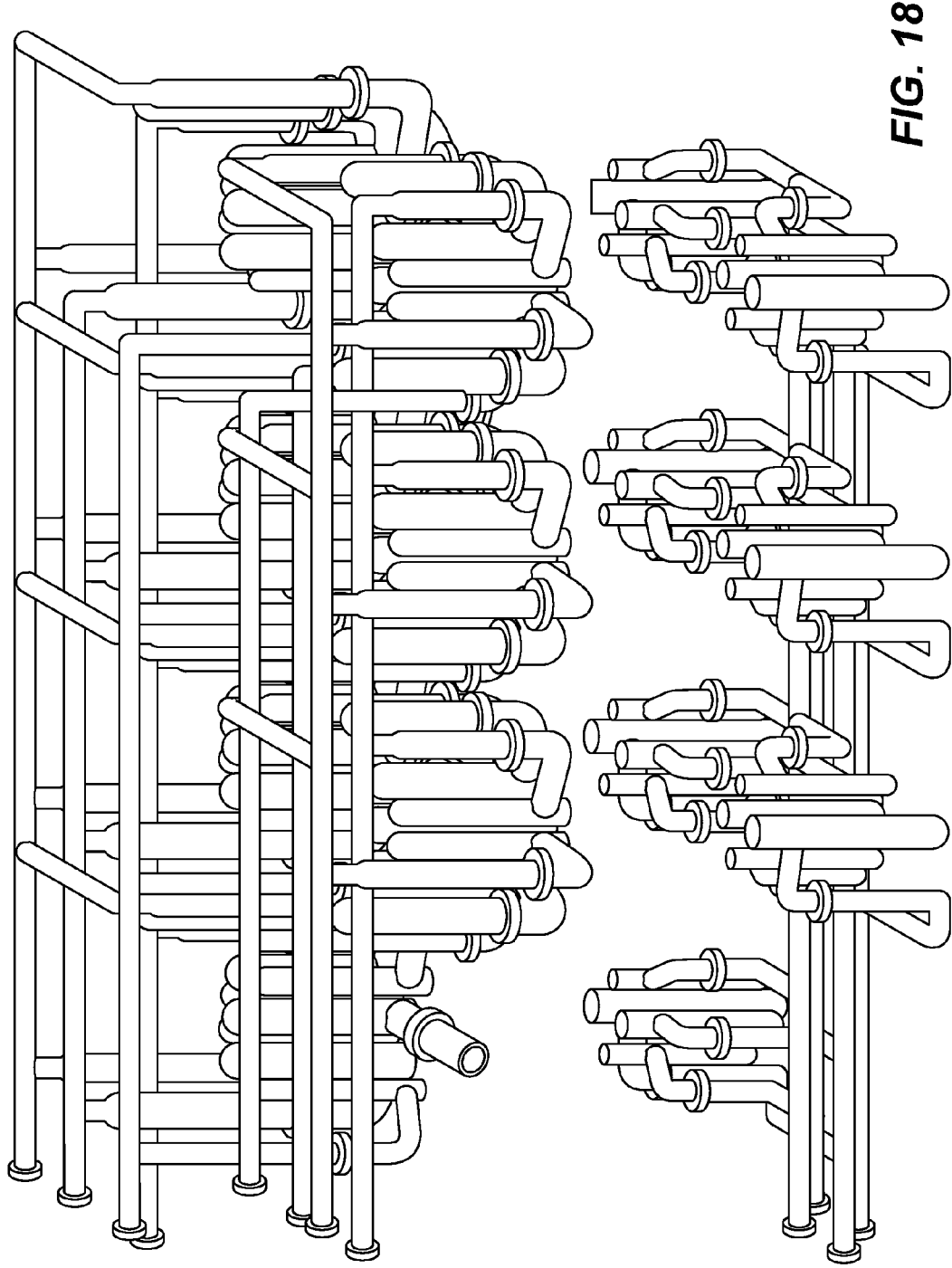
FIG. 18 is a three-dimensional diagram of the valves and piping network for the seven interconnected adsorbent beds of the exemplary hydrocarbon treating apparatus of FIG. 14.

The piping, valves, and headers for a complete skid as connected are shown in FIG. 18 without the adsorbent bed assemblies or support structure to illustrate the piping network. The top piping and headers are shown relative to the bottom piping and headers in this embodiment. The piping can be designed to be self-supporting, or additional structure can be provided to support the piping network within the skid.

One or more of the following Concepts A-O may be utilized with the processes, apparatus, and systems, provided above, to prepare a desirable product stream while maintaining high hydrocarbon recovery Concept A: using one or more kinetic swing adsorption process, such as pressure swing adsorption (PSA), thermal swing adsorption (TSA), calcination, and partial pressure swing or displacement purge adsorption (PPSA), including combinations of these processes; each swing adsorption process may be utilized with rapid cycles, such as using one or more rapid cycle pressure swing adsorption (RC-PSA) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884 which are each herein incorporated by reference in its entirety;

Concept B: removing acid gas with RC-TSA using advanced cycles and purges as described in U.S. patent application No. 61/447,848, filed Mar. 1, 2011, which is herein incorporated by reference in its entirety;

Concept C: using a mesopore filler to reduce the amount of trapped methane in the adsorbent and increase the overall hydrocarbon recovery, as described in U.S. Patent Application Publication Nos. 2008/0282892, 2008/0282885, 2008/028286, each of which is herein incorporated by reference in its entirety. The non-sweepable void space present within the adsorbent channel wall is can be defined by the total volume occupied by mesopores and macropores. Mesopores are defined by the IUPAC to be pores with sizes in the 20 to 500 angstrom size range. Macropores are defined herein to be pores with sizes greater than 500 angstrom and less than 1 micron. Because the flow channels are larger than 1 micron in size, they are not considered to be part of the macropore volume. The non-sweepable void space is defined herein as the open pore volume occupied by pores in the absorbent that are between 20 angstroms and 10,000 angstroms (1 micron) in diameter divided by the total volume of the contactor that is occupied by the absorbent material including associated mesopores and macropores in the absorbent structure. The non-sweepable void space, hereafter referred to collectively as mesopores, can be reduced by filling the mesopores between the particles to reduce the open volume while allowing rapid gas transport throughout the adsorbent layer. This filling of the non-sweepable void space is desired to reduce to acceptable levels the quantity of desired product lost during the rapid desorption step as well as to allow a high degree of adsorbent bed purity following desorption. Such mesopore filling can be accomplished in a variety of ways. For example, a polymer filler can be used with rapid diffusion of $H_2S$ and $CO_2$, such as a silicon rubber or a polymer with intrinsic porosity. Alternatively, a pyrolitic carbon having mesoporosity and/or microporosity could be used to fill the void space. Still another way is by filling the void space with inert solids of smaller sizes, or by filling the void space with a replenishable liquid through which the desired gases rapidly diffuse (such as water, solvents, or oil). Preferably, the void space within the adsorbent wall is reduced to less than about 40 volume percent (vol. %), preferably to less than 30 vol. %, and more preferably to less than 20 vol. %, and even more preferably to less than 10 vol. % and most preferably less than about 5 vol % of the open pore volume;

Concept D: choosing an appropriate adsorbent materials to provide high selectivity and minimize adsorption (and losses) of methane and other hydrocarbons, such as one or more of the zeolites described in U.S. Patent Application Publication Nos. 2008/0282887 and 2009/0211441, each of which is herein incorporated by reference in its entirety. Preferred adsorbents for the removal of acid gases are selected from a group consisting of mesoporous or microporous materials, with or without functionality for chemical reactions with acid gases. Examples of materials without functionality include cationic zeolites and stannosilicates. Functionalized materials that chemically react with $H_2S$ and $CO_2$ exhibit significantly increased selectivity for $H_2S$ and $CO_2$ over hydrocarbons. Furthermore, they do not catalyze undesirable reactions with hydrocarbons that would occur on acidic zeolites. Functionalized mesoporous adsorbents are also preferred, wherein their affinity toward hydrocarbons is further reduced compared to un-functionalized smaller pore materials, such as zeolites.

Alternatively, adsorption of heavy hydrocarbons can be kinetically suppressed by using small-pore functionalized materials, in which diffusion of heavy hydrocarbons is slow compared to $H_2S$ and $CO_2$. Care should also be taken to reduce condensation of hydrocarbons with carbon contents equal to or above about 4 (i.e., $C_4+$ hydrocarbons) on external surfaces of $H_2S$ and $CO_2$ selective adsorbents.

Non-limiting example of functional groups suitable for use herein include primary, secondary, tertiary and other non-protogenic, basic groups such as amidines, guanidines and biguanides. Furthermore, these materials can be functionalized with two or more types of functional groups. To obtain substantially complete removal of $H_2S$ and $CO_2$ from natural gas streams, an adsorbent material preferably is selective for $H_2S$ and $CO_2$ but has a low capacity for both methane and heavier hydrocarbons ($C_2+$). In one or more embodiments, it is preferred to use amines, supported on silica based or other supports because they have strong adsorption isotherms for acid gas species. They also have high capacities for such species, and as a consequence of their high heats of adsorption, they have a relatively strong temperature response (i.e. when sufficiently heated they readily desorb $H_2S$ and $CO_2$ and can thus be used without excessive temperature swings). Preferred are adsorbents that adsorb in the 25° C. to 70° C. range and desorb in the 90° C. to 140° C. range. In systems requiring different adsorbents for $CO_2$ and $H_2S$ removal, a layered bed comprising a suitable adsorbent for the targeted species may be desirable.

For $CO_2$ removal from natural gas, it is preferred to formulate the adsorbent with a specific class of 8-ring zeolite materials that has a kinetic selectivity. The kinetic selectivity of this class of 8-ring zeolite materials allows $CO_2$ to be rapidly transmitted into zeolite crystals while hindering the transport of methane so that it is possible to selectively separate $CO_2$ from a mixture of $CO_2$ and methane. For the removal of $CO_2$ from natural gas, this specific class of 8-ring zeolite materials preferably has a Si/Al ratio from about 1 to about 25. In other preferred embodiments, the Si/Al ratio of the zeolite material is from 2 to about 1000, preferably from about 10 to about 500, and more preferably from about 50 to about 300. It should be noted that as used herein, the term Si/Al is defined as the molar ratio of silica to alumina of the zeolitic structure. This preferred class of 8-ring zeolites that are suitable for use herein allow $CO_2$ to access the internal pore structure through 8-ring windows in a manner such that the ratio of single component diffusion coefficients for $CO_2$ over methane (i.e., $DCO_2/DCH_4$) is greater than 10, preferably greater than about 50, and more preferably greater than about 100 and even more preferably greater than 200.

In many instances, nitrogen also has to be removed from natural gas or gas associated with the production of oil to obtain high recovery of a purified methane product from nitrogen containing gas. There have been very few molecular sieve sorbents with significant equilibrium or kinetic selectivity for nitrogen separation from methane. For $N_2$ separation from natural gas it is also preferred to formulate the adsorbent with a class of 8-ring zeolite materials that has a kinetic selectivity. The kinetic selectivity of this class of 8-ring materials allows $N_2$ to be rapidly transmitted into zeolite crystals while hindering the transport of methane so that it is possible to selectively separate $N_2$ from a mixture of $N_2$ and methane. For the removal of $N_2$, from natural gas, this specific class of 8-ring zeolite materials also has a Si/Al ratio from about 2 to about 1000, preferably from about 10 to about 500, and more preferably from about 50 to about 300. This preferred class of 8-ring zeolites that are suitable for use herein allow $N_2$ to access the internal pore structure through 8-ring windows in a manner such that the ratio of single component diffusion coefficients for $N_2$ over methane (i.e., $DN_2/DCH_4$) is greater than 5, preferably greater than about 20, and more preferably greater than about 50 and even more preferably greater than 100. Resistance to fouling in swing adsorption processes during the removal $N_2$ from natural gas is another advantage offered by this class of 8-ring zeolite materials.

In a preferred embodiment, $H_2S$ is selectively removed with a non-aqueous sorbent comprising a basic non-protogenic nitrogenous compound supported on a marcroporous, mesoporous, or microporous solid. The non-protogenic nitrogenous compound selectively reacts with at least a portion of the $H_2S$ in the feed gas mixture. Examples of suitable porous solid supports include activated charcoal or solid oxides (including mixed oxides), such as alumina, silica, silica-alumina or acidic or non-acidic zeolites. The basic non-protogenic nitrogenous compound may simply be physically sorbed on the support material (e.g. by impregnation or bonded with or grafted onto it by chemical reaction with the base itself or a precursor or derivative in which a substituent group provides the site for reaction with the support material in order to anchor the sorbent species onto the support). Bonding is not, however, required for an effective solid phase sorbent material. Support materials which contain reactive surface groups, such as the silanol groups found on zeolites and the M41S silica oxides are capable of reacting with siloxane groups in compounds, such as trimethoxysilylpropyldimethylamine Non-protogenic nitrogenous compounds do not enter into chemisorption reactions with $CO_2$ in the absence of water although they do undergo reaction with $H_2S$. This differential chemical reactivity is used to make the separation between the $H_2S$ and the $CO_2$. A wide variety of basic nitrogen-containing compounds may be used as the essential sorbent. If desired, a combination of such compounds may be used. The requirement for the desired selectivity for $H_2S$ adsorption is that the nitrogenous groups be non-protogenic, that is, incapable of acting as a proton donor. The nitrogenous groups therefore do not contain an acidic, dissociable hydrogen atom, such as nitrogen in a primary or secondary amine. It is not required that the whole compound be aprotic, only that the nitrogen-containing groups in the compound be non-protogenic. Non-protogenic nitrogen species cannot donate an $H^+$ (proton), which is a prerequisite for the formation of carbamates as a route for the $CO_2$ chemisorption reaction in the absence of water; they are non-nucleophilic under the prevailing reaction conditions. Suitable nitrogenous compounds include tertiary amines such as triethylamine, triethanolamine (TEA), methyldiethanolamine (MDEA), N-methyl diethanolamine ($CH_3N(C_2H_4OH)_2$), NNN'N'-tetrakis(2-hydroxyethyl) ethylenediamine as well as non-protogenic nitrogenous bases with cyclic, multicyclic, and acyclic structures, such as imines, heterocyclic imines and amines, amidines (carboxamidines) such as dimethylamidine, guanidines, triazabicyclodecenes, imidazolines, and pyrimidines. Compounds such as the N,N-di(lower alkyl) carboxamidines where lower alkyl is preferably $C_1$-$C_6$ alkyl, N-methyltetrahydropyrimidine (MTHP), 1,8-diazabicyclo[5.4.0]-undece-7-ene (DBU), 1,5,7-triazabicyclo[4.4.0]dec-5-ene (TBD), 7-methyl-1,5,7-triazabicyclo[4.4.0]dec-5-ene (MTBD), 1,5-diazabicyclo[4.3.0]non-5-ene (DBN), substituted guanidines of the formula $(R^1R^2N)(R^3R^4N)C=N-R^5$ where $R^1$, $R^2$, $R^3$ and $R^4$ are preferably lower alkyl ($C_1$-$C_6$) and $R^5$ is preferably H or lower alkyl ($C_1$-$C_6$), such as 1,1,3,3-tetramethylguanidine and biguanide, may also be used. Other substituent groups on these compounds such as higher alkyl, cycloalkyl, aryl, alkenyl, and substituted alkyl and other structures may also be used.

Another class of materials that is capable of removing $H_2S$ and $CO_2$, from natural gas streams is cationic zeolites. Selectivity of these materials for $H_2S$ and $CO_2$ depends on the framework structure, choice of cation, and the Si/Al ratio. In a preferred embodiment the Si/Al ratio for cationic materials is in a range from 1 to 50 and more preferably a range from 1 to 10. Examples of cationic zeolite include zeolites, 4A, 5A and faujasites (Y and X). It is preferred to use these materials for selectively removing $H_2S$ and $CO_2$ after the feed stream has been dehydrated.

Other non-limiting examples of preferred selective adsorbent materials for use in embodiments herein include microporous materials such as zeolites, AlPOs, SAPOs, MOFs (metal organic frameworks), ZIFs (zeolitic imidazolate frameworks, such as ZIF-7, ZIF-8, ZIF-22, etc.) and carbons, as well as mesoporous materials such as the amine functionalized MCM materials. For the acidic gases such as hydrogen sulfide and carbon dioxide which are typically found in natural gas streams, adsorbent such as cationic zeolites, amine-functionalized mesoporous materials, stannosilicates, carbons are also preferred;

Concept E: depressurizing one or more RC-PSA units in multiple steps to intermediate pressures so that the acid gas exhaust can be captured at a higher average pressure, thereby decreasing the compression required for acid gas injection. Pressure levels for the intermediate depressurization steps may be matched to the interstage pressures of the acid gas compressor(s) to optimize the overall compression system;

Concept F: using exhaust or recycle streams to minimize processing and hydrocarbon losses, such as using exhaust streams from one or more RC-PSA units as fuel gas instead of re-injecting or venting;

Concept G: using multiple adsorbent materials in a single bed to remove trace amounts of a first contaminant, such as $H_2S$, before removal of a second contaminant, such as $CO_2$; such segmented beds may provide rigorous acid gas removal down to ppm levels with RC-PSA units with minimal purge flow rates;

Concept H: using feed compression before one or more RC-PSA units to achieve a desired product purity;

Concept I: contemporaneous removal of non-acid gas contaminants such as mercaptans, COS, and BTEX; selection processes and materials to accomplish the same;

Concept J: using structured adsorbents for gas-solid contactors to minimize pressure drop compared to conventional packed beds;

Concept K: selecting a cycle time and cycle steps based on adsorbent material kinetics;

Concept L: using a process and apparatus that uses, among other equipment, two RC-PSA units in series, wherein the first RC-PSA unit cleans a feed stream down to a desired product purity and the second RC-PSA unit cleans the exhaust from the first unit to capture methane and maintain high hydrocarbon recovery; use of this series design may reduce the need for a mesopore filler;

Concept M: using parallel channel contactors, wherein gas/solid contacting takes place in relatively small diameter adsorbent-lined channels. This structure of the contactor provides the benefits of rapid adsorption kinetics through minimization of gas film resistance and high gas-solid communication. A preferred adsorber design generates a sharp adsorption front.

It is preferred to have very rapid gas to adsorbent kinetics, i.e. the length through which the target species (e.g., target gas) diffuses to make contact with the adsorbent wall is kept short, preferably less than 1000 microns, more preferably less than 200 microns, and most preferably less than 100 microns. Favorable adsorbent kinetics may be realized by, while limiting bed pressure drop to acceptable values, utilizing parallel channel contactors wherein the feed and purge gases are confined to a plurality of very narrow (1000 to 30 micron diameter) open channels that are lined to an effective thickness of the adsorbent material.

By "effective thicknesses" we mean a range of about 500 microns to 5 microns for most applications. In the most limiting case of laminar gas flow, the very narrow channels limit the maximum diffusion distance for a trace species to no more than half the diameter of the channel. Even when adsorbing the desired species at the leading edge of the adsorption front, where their concentrations approach zero in the gas phase, a sharp adsorption front can be maintained by using such small diameter parallel channel structured adsorption bed configurations. Such a configuration can be in the form of multiple independent parallel channels, or in the form of very wide, very short channels as may be achieved by using a spiral wound design;

Concept N: a means for rapidly heating and cooling the adsorbent bed structure so that adsorption can occur at a lower temperature and desorption at a higher temperature. The adsorption step then occurs at high pressure and the higher temperature desorption step can optionally take place at a reduced pressure in order to increase adsorbent swing capacity. Depending upon adsorbent properties, it may be desirable to use a bed architecture suitable for either an externally temperature controlled or internally temperature controlled scheme.

By "internal temperature control" we mean the use of a heating and cooling fluid media, either gaseous or liquid, preferably liquid, that can be circulated through the same adsorbent lined channels that are utilized for the gaseous feed flow. Internal temperature control requires that the adsorbent material not be adversely affected by the temperature control fluid and that the temperature control fluid be easily separated from the previously adsorbed species ($H_2S$ and $CO_2$) following the heating step. Further, for internal temperature control, the pressure drop across each of the parallel channels in the structured bed during the gaseous feed adsorption step is preferably sufficiently high to clear each channel (or the single channel in the case of spiral wound designs) of the temperature control fluid. Additionally, internal fluid flow temperature designs preferably utilize an adsorbent that does not strongly adsorb the temperature control fluid so that $H_2S$ and $CO_2$ may be usefully adsorbed even in the presence of the temperature control fluid.

Non-limiting examples of such adsorbents include amine functionalized microporous and mesoporous adsorbents. A non-limiting example of such a system would be the use of supported amines on a water stable support with the use of hot and cold water (pressurized liquid or used as steam for heating) for heating and cooling. Whereas liquid water may be left within the adsorbent wall during the adsorption step, if the thickness of the adsorbent wall is kept small (less than 1000 microns, preferably less than 200 microns, and most preferably less than 100 microns) it may be possible for $H_2S$ and $CO_2$ to diffuse through the liquid water in time scales less than 1 minute, more preferred less than 10 seconds to become adsorbed by the supported amine Following the desorption step, $H_2S$ and $CO_2$ can be easily separated using distillation or other methods known to those skilled in the art.

By "external temperature control" we mean an adsorbent bed structure where the heating and cooling fluid is kept from contact with the gas-carrying adsorbent channels. Such a structure can resemble a tube and shell heat exchanger, plate and frame heat exchanger or hollow fibers with a fluid impermeable barrier layer on the outer diameter or on the inner diameter, or any other suitable structures. In order to obtain rapid heating and cooling, the distance through which the heat diffuses from the temperature control fluid to the adsorbent layer should be kept to a minimum, ideally less than 10,000 microns, more preferably less than 1000 microns, most preferably less than 200 microns.

A non-limiting example of such an external temperature control bed design would be the use of hollow fibers with a fluid impermeable barrier layer on the outer diameter wherein the hollow fibers are comprised of a mixed matrix system of polymeric and supported amine adsorbents. Feed gas would be passed through the inner diameter of the porous fiber to be adsorbed by the adsorbent at lower temperatures, while cool temperature control fluid is flowing over the fibers outer diameters. Desorption would be accomplished by passing hot temperature control fluid, preferably in a counter-current direction over the fibers outer diameter, thus heating the adsorbent. The cycle is completed by exchanging the hot temperature control fluid with cold fluid to return the fiber containing the adsorbent to the desired adsorption temperature.

In a preferred embodiment, the rate of heat flow in the system would be such that a sharp temperature gradient in the temperature control fluid would be established during heating and cooling such that the sensible heat of the system can be recuperated within the adsorbent bed structure. For such a non-limiting hollow fiber example, the useful fiber outer diameter dimension is less than 20,000 microns, preferably less than 2000 microns, and most preferably less than 1000 microns. The useful hollow fiber inner diameters (the feed gas channels) is less than 10,000 microns, preferably less than 1000 microns, and most preferably less than 500 microns as suitable based on the desired adsorption and desorption cycle times, feed adsorbed species concentrations, and adsorbent layer swing capacity for those species.

In some embodiments, it is advantageous to keep the ratio of non-adsorbing thermal mass in the adsorbent bed to adsorbent as low as possible. This ratio is preferably be less than 20, more preferably less than 10, and most preferred less than 5. In this manner, the sensible heat of the system that is swung in each cycle may be kept to a minimum;

Concept O: A relatively low flow of about 0.01 to 5 vol. % of the total feed of a clean gas substantially free of $H_2S$ or $CO_2$ is utilized as a purge gas. Non-limiting examples of such gases (i.e., "clean gas") include methane and nitrogen that are maintained flowing through the parallel channels in a direction counter-current to the feed direction during at least a portion of the desorption steps of the process. It is preferred that the flow rate of this clean gas be sufficient to overcome the natural diffusion of the desorbing $H_2S$ and $CO_2$ to maintain the product end of the adsorbing channel in a substantially clean condition. That is, the purge stream should have sufficient flow rate to sweep the desorbing $CO_2$ and $H_2S$ from the channels and/or pores. It is this counter-current purge flow during desorption that ensures that on each subsequent adsorption cycle there is no breakthrough of target species, such as $H_2S$ or $CO_2$ into the product stream. A further benefit or objective of the clean purge is to assist in desorption of contaminants by reducing the partial pressure of contaminants in the flow channels of the adsorbent bed. This lessening of the partial pressure may be utilized to drive the contaminants from the adsorbent bed.

A preferred cycle and bed design for the practice of the present invention is that the product end of the adsorbent channels (i.e. the end opposite the end where feed gases enter) have a low, or ideally essentially zero concentration of adsorbed $H_2S$ and $CO_2$. In this manner, and with suitable structured channels as described above, the $H_2S$ and $CO_2$ are rigorously removed from the feed gas stream. The downstream end of the bed can be kept clean as described by maintaining a low flow of a clean fluid substantially free of $H_2S$ and $CO_2$, in a counter-current direction relative to the feed direction, during the desorption step(s), or more preferably, during all the heating and cooling steps in the cycle. It is further preferred that during the adsorption step, the adsorption part of the cycle be limited to a time such that the advancing adsorption front of $H_2S$ and $CO_2$ loaded adsorbent not reach the end of the channels, i.e. adsorption to be halted prior to $H_2S$ and/or $CO_2$ breakthrough so that a substantially clean section of the adsorbent channel remains substantially free of target species. With reasonably sharp adsorption fronts, this allows more than 50 vol. % of the adsorbent to be utilized, more preferred more than 75 vol. %, and most preferred more than 85 vol. %.

The processes, apparatus, and systems provided herein are useful in large gas treating facilities, such as facilities that process more than five million standard cubic feet per day (MSCFD) of natural gas, or more than 15 MSCFD of natural gas, or more than 25 MSCFD of natural gas, or more than 50 MSCFD of natural gas, or more than 100 MSCFD of natural gas, or more than 500 MSCFD of natural gas, or more than one billion standard cubic feet per day (BSCFD) of natural gas, or more than two BSCFD of natural gas.

Compared to conventional technology, the provided processes, apparatus, and systems require lower capital investment, lower operating cost, and less physical space, thereby enabling implementation offshore and in remote locations, such as Arctic environments. The provided processes, apparatus, and systems provide the foregoing benefits while providing high hydrocarbon recovery as compared to conventional technology.

Additional embodiments A-T are provided as follows:

Embodiment A

A swing adsorption contactor system comprising: a plurality of hollow rigid liners each having an inner surface and open axial ends, adjacent liners being fixedly connected to each other; a monolith adsorbent contactor being disposed within each liner, each monolith adsorbent contactor having an outer surface spaced from the inner surface of the liner; and a bonding agent disposed in the space between the outer surface of the monolith adsorbent contactor and the inner surface of the liner to form a seal to prevent gaseous flow in the space.

Embodiment B

The swing adsorption contactor system of Embodiment A, wherein the monolith adsorbent contactor includes a stack of at least two monolith adsorbent contactors.

Embodiment C

The swing adsorption contactor system of Embodiment B, wherein the stack of at least two monolith adsorbent contactors are held together by tape about adjacent axial ends of the two monolith adsorbent contactors.

Embodiment D

The swing adsorption contactor system of any of Embodiments A-C, wherein each liner has integral stand-offs that project in the axial direction from each axial end of the liner.

Embodiment E

The swing adsorption contactor system of any of Embodiments A-D, wherein each liner and monolith adsorbent contactor has a mating polygonal cross-section shape.

Embodiment F

The swing adsorption contactor system of any of Embodiments A-E, wherein the bonding agent is a polymer-based composition, e.g., thermoplastic and thermosets, adhesive compositions, such as contact adhesives or hot melt adhesives, rubber, i.e., natural or synthetic, elastomers, or combination thereof.

Embodiment G

The swing adsorption contactor system of any of Embodiments A-F, wherein the bonding agent is curable, e.g., acrylics, urethanes, and epoxies.

Embodiment H

The swing adsorption contactor system of Embodiments G, wherein the curable bonding agent is semi-rigid when cured.

Embodiment I

A method of assembling a swing adsorption contactor system comprising the steps of: fixedly connecting a plurality of hollow rigid liners to each other, wherein each of the liners has an inner surface and open axial ends; placing a monolith adsorbent contactor within each liner, each monolith adsorbent contactor having an outer surface, wherein the placing step includes spacing the outer surface of each monolith adsorbent contactor from the inner surface of each liner; placing a bonding agent in the space between the outer surface of the monolith adsorbent contactor and the inner surface of the liner to form a seal to prevent gaseous flow in the space.

Embodiment J

The method of assembling a swing adsorption vessel of Embodiment I, wherein the bonding agent is a polymer-based composition, e.g., thermoplastic and thermosets, adhesive compositions, such as contact adhesives or hot melt adhesives, rubber, e.g., natural or synthetic, elastomers, or combination thereof.

Embodiment K

The method of assembling a swing adsorption vessel of Embodiment I or J, wherein the bonding agent is curable, e.g., acrylics, urethanes, and epoxies.

Embodiment L

The method of assembling a swing adsorption vessel of Embodiment K, wherein the curable bonding agent is semi-rigid when cured.

Embodiment M

The method of assembling a swing adsorption vessel of any of Embodiments I-L, wherein the swing adsorption vessel has a housing that receives the plurality of hollow rigid liners, further comprising the step of: placing a protective ring of wax within the housing at its base before the plurality of hollow rigid liners are placed within the housing so that the ring of wax deforms and seals the bottom of the space between the outer surface of the monolith adsorbent contactor and the inner surface of each liner.

Embodiment N

The method of assembling a swing adsorption vessel of any of Embodiment I-M, further comprising the step of placing a protective layer of wax on the top axial end of each monolith adsorbent contactor before the placing of a bonding agent step.

Embodiment O

The method of assembling a swing adsorption vessel of Embodiment N, further comprising the step of:
melting both the protective layer of wax on the top axial end of each monolith adsorbent contactor and the protective ring of wax within the housing after the step of permitting the curable bonding agent to cure into a semi-rigid material.

Embodiment P

A method of processing hydrocarbons comprising the steps of: (a)
providing an apparatus comprising the swing adsorption contactor system of any of embodiments A-H or as shown in the attached figures, (b) recovering at least 5 million, or at least 15 million, or at least 25 million, or at least 50 million, or at least 100 million, or at least 500 million, or at least 1 billion, or at least 2 billion standard cubic feet per day (SCFD) of natural gas.

Embodiment Q

The method of Embodiment P, wherein one or more additional steps utilize a kinetic swing adsorption process selected from the group consisting of: pressure swing adsorption (PSA), thermal swing adsorption (TSA), calcination, partial pressure swing or displacement purge adsorption (PPSA), and combinations of these processes.

Embodiment R

The method of Embodiment Q, wherein one or more swing adsorption process utilizes rapid cycles.

Embodiment S

The method of any of Embodiments P-R, wherein a gaseous feed stream is processed to achieve: (a) a desired dew point, (b) a desired level of detoxification, (c) a desired corrosion protection composition, (d) a desired dehydration level, (e) a desired gas heating value, (f) a desired purification level, or (g) combinations thereof.

Embodiment T

A hydrocarbon treating apparatus comprising: an apparatus comprising the swing adsorption contactor system of any of embodiments A-H or as shown in the attached figures, wherein the hydrocarbon treating apparatus capacity is at least 5 million, or at least 15 million, or at least 25 million, or at least 50 million, or at least 100 million, or at least 500 million, or at least 1 billion, or at least 2 billion standard cubic feet per day (SCFD) of natural gas.

Additional embodiments 1 to 14 are provided in the following paragraphs:

1. A swing adsorption contactor system comprising: a plurality of hollow rigid liners, each liner having an inner surface that defines an interior region, a first open axial end along a longitudinal axis, a second open axial end along the longitudinal axis opposite the first open axial end, and an outer surface external to the interior region; a plurality of monolith adsorbent contactors, wherein one of the plurality of monolith adsorbent contactors is disposed within one of the plurality of liners, the one monolith adsorbent contactor having a body that defines at least one passage through the body along the longitudinal axis and an outer surface of the body; and a bonding agent being disposed between the outer surface of the monolith adsorbent contactor and the inner surface of the liner to hinder gaseous flow between the monolith adsorbent contactor and the hollow rigid liner.

2. The swing adsorption contactor system according to paragraph 1, wherein the two or more of the plurality of monolith adsorbent contactors are stacked together along the same longitudinal axis within one of the plurality of hollow rigid liners.

3. The swing adsorption contactor system according to paragraph 2, wherein the stacked monolith adsorbent contactors are coupled via tape about adjacent ends.

4. The swing adsorption contactor system according to any one of paragraphs 1 to 3, further comprising two or more of the plurality of hollow rigid liners being adjacent to each other being fixedly connected to each other.

5. The swing adsorption contactor system according to any one of paragraphs 1 to 4, wherein each liner has a mating polygonal cross-section shape.

6. The swing adsorption contactor system according to any one of paragraphs 1 to 5, wherein at least one liner has integral stand-offs that project in the axial direction from each axial end of the liner.

7. The swing adsorption contactor system according to paragraphs 1 to 6, wherein the bonding agent is semi-rigid when cured.

8. A method of assembling a swing adsorption contactor system comprising: providing a plurality of hollow rigid liners, each hollow rigid liner having an inner surface that defines an interior region, a first open axial end along a longitudinal axis, a second open axial end along the longitudinal axis opposite the first open axial end, and an outer surface external to the interior region; placing one of a plurality of monolith adsorbent contactors within one of plurality of hollow rigid liners, the one monolith adsorbent contactor having a body that defines at least one passage through the body along the longitudinal axis and an outer surface of the body; and bonding the one of the plurality of monolith adsorbent contactors with the one of plurality of hollow rigid liners via a bonding agent that is disposed between the outer surface of the monolith adsorbent contactor and the inner surface of the hollow rigid liner, wherein the bonding agent hinders the flow of fluids between the monolith adsorbent contactor and the hollow rigid liner.

9. The method of assembling a swing adsorption vessel according to paragraph 8, further comprising curing bonding agent into a semi-rigid material.

10. The method of assembling a swing adsorption vessel according to paragraphs 8 to 9, further comprising melting both the protective layer of wax on the top axial end of each monolith adsorbent contactor and the protective ring of wax within the housing after curing the bonding agent.

11. The method of assembling a swing adsorption vessel according to any one of paragraphs 8 to 10, wherein the swing adsorption vessel has a housing that receives the plurality of hollow rigid liners, further comprising placing a protective ring of wax between the plurality of hollow rigid liners and the housing so that the protective ring of wax deforms and seals the region between the outer surface of the monolith adsorbent contactor and the inner surface of the liner.

12. The method of assembling a swing adsorption vessel according to any one of paragraphs 8 to 11, further comprising placing a protective layer of wax on the top axial end of each monolith adsorbent contactor before the placing of a bonding agent step.

13. The method of assembling a swing adsorption vessel according to any one of paragraphs 8 to 12, further comprising fixedly connecting two of more of the plurality of hollow rigid liners to each other.

14. The method of assembling a swing adsorption vessel according to any one of paragraphs 8 to 13, wherein fixedly connecting further comprises welding the outer surface of the two of more of the plurality of hollow rigid liners.

In view of the many possible embodiments to which the principles of the disclosed invention may be applied, it should be recognized that the illustrative embodiments are only preferred examples of the invention and should not be taken as limiting the scope of the invention.

What is claimed is:

1. A swing adsorption contactor system comprising:
   a plurality of hollow rigid liners each having an inner surface and open axial ends, adjacent liners being fixedly connected to each other;
   a monolith adsorbent contactor being disposed within each liner, each monolith adsorbent contactor having an outer surface spaced from the inner surface of the liner; and
   a bonding agent being disposed in the space between the outer surface of the monolith adsorbent contactor and the inner surface of the liner to form a seal to prevent gaseous flow in the space.

2. The swing adsorption contactor system according to claim 1, wherein the monolith adsorbent contactor includes a stack of at least two monolith adsorbent contactors.

3. The swing adsorption contactor system according to claim 2, wherein the stack of at least two monolith adsorbent contactors are held together by tape about adjacent axial ends of the two monolith adsorbent contactors.

4. The swing adsorption contactor system according to claim 1, wherein each liner and monolith adsorbent contactor has a mating polygonal cross-section shape.

5. The swing adsorption contactor system according to claim 1, wherein the bonding agent is curable.

6. The swing adsorption contactor system according to claim 5, wherein the curable bonding agent is semi-rigid when cured.

7. A method of assembling a swing adsorption contactor system comprising the steps of:
   fixedly connecting a plurality of hollow rigid liners to each other, wherein each of the liners has an inner surface and open axial ends;
   placing a monolith adsorbent contactor within each liner, each monolith adsorbent contactor having an outer surface, wherein the placing step includes spacing the outer surface of each monolith adsorbent contactor from the inner surface of each liner;
   placing a bonding agent in the space between the outer surface of the monolith adsorbent contactor and the inner surface of the liner to form a seal to prevent gaseous flow in the space, wherein the bonding agent is curable;
   permitting the curable bonding agent to cure into a semi-rigid material; and
   wherein the swing adsorption vessel has a housing that receives the plurality of hollow rigid liners, further comprising the step of: placing a protective ring of wax within the housing at its base before the plurality of hollow rigid liners are placed within the housing so that the ring of wax deforms and seals the bottom of the space between the outer surface of the monolith adsorbent contactor and the inner surface of each liner.

8. The method of assembling a swing adsorption vessel according to claim 7, further comprising the step of placing a protective layer of wax on the top axial end of each monolith adsorbent contactor before the placing of a bonding agent step.

9. The method of assembling a swing adsorption vessel according to claim 8, further comprising the step of:
   melting both the protective layer of wax on the top axial end of each monolith adsorbent contactor and the protective ring of wax within the housing after the step of permitting the curable bonding agent to cure into a semi-rigid material.

10. A swing adsorption contactor system comprising:
    a plurality of hollow rigid liners, each liner having an inner surface that defines an interior region, a first open axial end along a longitudinal axis, a second open axial end along the longitudinal axis opposite the first open axial end, and an outer surface external to the interior region, wherein at least one liner has integral stand-offs that project in the axial direction from each axial end of the liner;
    a plurality of monolith adsorbent contactors, wherein one of the plurality of monolith adsorbent contactors is disposed within one of the plurality of liners, the one monolith adsorbent contactor having a body that defines at least one passage through the body along the longitudinal axis and an outer surface of the body; and a bonding agent being disposed between the outer surface of the monolith adsorbent contactor and the inner surface of the liner to hinder gaseous flow between the monolith adsorbent contactor and the hollow rigid liner.

11. The swing adsorption contactor system according to claim 10, wherein the two or more of the plurality of monolith adsorbent contactors are stacked together along the same longitudinal axis within one of the plurality of hollow rigid liners.

12. The swing adsorption contactor system according to claim 11, wherein the stacked monolith adsorbent contactors are coupled via tape about adjacent ends.

13. The swing adsorption contactor system according to claim 10, further comprising two or more of the plurality of hollow rigid liners that are adjacent to each other being fixedly connected to each other.

14. The swing adsorption contactor system according to claim 13, wherein each liner has a mating polygonal cross-section shape.

15. The swing adsorption contactor system according to claim 10, wherein the bonding agent is semi-rigid when cured.

16. A method of assembling a swing adsorption contactor system comprising:
 providing a plurality of hollow rigid liners, each hollow rigid liner having an inner surface that defines an interior region, a first open axial end along a longitudinal axis, a second open axial end along the longitudinal axis opposite the first open axial end, and an outer surface external to the interior region;
 placing one of a plurality of monolith adsorbent contactors within one of plurality of hollow rigid liners, the one monolith adsorbent contactor having a body that defines at least one passage through the body along the longitudinal axis and an outer surface of the body;
 bonding the one of the plurality of monolith adsorbent contactors with the one of plurality of hollow rigid liners via a bonding agent that is disposed between the outer surface of the monolith adsorbent contactor and the inner surface of the hollow rigid liner, wherein the bonding agent hinders the flow of fluids between the monolith adsorbent contactor and the hollow rigid liner;
 curing bonding agent into a semi-rigid material; and
 wherein the swing adsorption vessel has a housing that receives the plurality of hollow rigid liners, further comprising placing a protective ring of wax between the plurality of hollow rigid liners and the housing so that the protective ring of wax deforms and seals the region between the outer surface of the monolith adsorbent contactor and the inner surface of the liner.

17. The method of assembling a swing adsorption vessel according to claim 16, further comprising placing a protective layer of wax on the top axial end of each each monolith adsorbent contactor before the placing of a bonding agent step.

18. The method of assembling a swing adsorption vessel according to claim 17, further comprising melting both the protective layer of wax on the top axial end of each monolith adsorbent contactor and the protective ring of wax within the housing after curing the bonding agent.

19. The method of assembling a swing adsorption vessel according to claim 16, further comprising fixedly connecting two of more of the plurality of hollow rigid liners to each other.

20. The method of assembling a swing adsorption vessel according to claim 16, wherein fixedly connecting further comprises welding the outer surface of the two of more of the plurality of hollow rigid liners.

\* \* \* \* \*